United States Patent
Kosugi et al.

(10) Patent No.: US 7,823,472 B2
(45) Date of Patent: *Nov. 2, 2010

(54) SHIFT CONTROL DEVICE FOR VEHICLE, AND VEHICLE INCLUDING THE SHIFT CONTROL DEVICE

(75) Inventors: Makoto Kosugi, Shizuoka-ken (JP); Takuji Murayama, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 547 days.

This patent is subject to a terminal disclaimer.

(21) Appl. No.: 10/591,559

(22) PCT Filed: Jun. 28, 2005

(86) PCT No.: PCT/JP2005/011803

§ 371 (c)(1),
(2), (4) Date: Jul. 25, 2007

(87) PCT Pub. No.: WO2006/003878

PCT Pub. Date: Jan. 12, 2006

(65) Prior Publication Data

US 2008/0035410 A1     Feb. 14, 2008

(30) Foreign Application Priority Data

Jul. 1, 2004    (JP) .............................. 2004-195632

(51) Int. Cl.
*F16H 59/00*    (2006.01)
*F16H 61/00*    (2006.01)
*F16H 63/00*    (2006.01)

(52) U.S. Cl. ...................................... 74/335; 74/337.5
(58) Field of Classification Search .................. 74/335, 74/337.5
See application file for complete search history.

(56) References Cited

U.S. PATENT DOCUMENTS 1,500,878 A    7/1924    Kruchten (Continued)

FOREIGN PATENT DOCUMENTS

DE    4336445    4/1995

(Continued)

OTHER PUBLICATIONS

Co-Pending U.S. Appl. No. 11/514,387, filed Aug. 31, 2006. Title: Clutch Failure Detector, Automatic Clutch System, and Straddle-Type Vehicle.

(Continued)

*Primary Examiner*—Tisha D Lewis
(74) *Attorney, Agent, or Firm*—Keating & Bennett, LLP

(57) ABSTRACT

A transmission mechanism is provide that can be interposed between a shift actuator and a shift shaft. The mechanism can include first and second coupling parts that can be coupled for movement relative to each other; a biasing mechanism that can be configured for urging the first and second coupling parts toward a neutral position; and a stopper mechanism that can be configured for stopping the relative movement of one of the first and second coupling parts when moved relatively from the neutral position against urging force of the biasing mechanism. When the shift actuator is stroked by a predetermined amount, a dog can be compulsorily disengaged as the first and second coupling parts are moved together by the stopper mechanism, and engaged as one of the first and second coupling parts moves relatively against the urging force, for allowing smooth shift change.

22 Claims, 23 Drawing Sheets

U.S. PATENT DOCUMENTS

| | | | |
|---|---|---|---|
| 3,122,936 A * | 3/1964 | Dykes | 74/335 |
| 4,497,222 A | 2/1985 | Nagaoka et al. | |
| 5,121,649 A | 6/1992 | Randriazanamparany et al. | |
| 5,279,172 A * | 1/1994 | Genise | 74/335 |
| 5,878,622 A * | 3/1999 | Tischer | 74/335 |
| 5,964,680 A | 10/1999 | Salecker et al. | |
| 6,220,109 B1 | 4/2001 | Fischer et al. | |
| 6,257,081 B1 | 7/2001 | Gagnon et al. | |
| H2031 H | 6/2002 | Harrell et al. | |
| 6,481,554 B1 | 11/2002 | Ota et al. | |
| 6,497,160 B2 * | 12/2002 | Meyer et al. | 74/335 |
| 6,502,681 B1 | 1/2003 | Ota et al. | |
| 6,524,224 B2 | 2/2003 | Gagnon et al. | |
| 6,564,663 B2 | 5/2003 | Rioux et al. | |
| 6,569,057 B2 | 5/2003 | Jones et al. | |
| 6,880,422 B2 * | 4/2005 | Yamamoto | 74/473.12 |
| 6,896,112 B2 | 5/2005 | Berger et al. | |
| 6,910,987 B2 | 6/2005 | Richards | |
| 6,931,839 B2 | 8/2005 | Foster | |
| 6,981,429 B2 * | 1/2006 | Maisch et al. | 74/335 |
| 7,000,717 B2 | 2/2006 | Ai et al. | |
| 2004/0020315 A1 * | 2/2004 | Vilou et al. | 74/7 A |
| 2004/0118652 A1 | 6/2004 | Muetzel et al. | |
| 2006/0094567 A1 | 5/2006 | Kosugi et al. | |
| 2006/0124422 A1 | 6/2006 | Zenno | |
| 2006/0128525 A1 | 6/2006 | Zenno | |
| 2006/0128527 A1 | 6/2006 | Zenno et al. | |
| 2006/0160660 A1 | 7/2006 | Zenno et al. | |
| 2006/0169561 A1 | 8/2006 | Ooishi et al. | |
| 2006/0169562 A1 | 8/2006 | Kosugi | |
| 2006/0169569 A1 | 8/2006 | Ooishi et al. | |

FOREIGN PATENT DOCUMENTS

| | | |
|---|---|---|
| DE | 19709419 | 10/1997 |
| DE | 19853333 | 6/1999 |
| DE | 10107962 | 8/2002 |
| DE | 10327438 | 1/2004 |
| DE | 10304588 | 4/2004 |
| DE | 10253809 A1 | 5/2004 |
| DE | 10306934 | 9/2004 |
| DE | 10393681 | 10/2005 |
| EP | 0129417 | 6/1984 |
| EP | 0328362 | 8/1989 |
| EP | 385629 | 9/1990 |
| EP | 0 490 730 A1 | 12/1991 |
| EP | 0 579 532 A1 | 1/1994 |
| EP | 0590240 | 4/1994 |
| EP | 0635391 | 7/1994 |
| EP | 742386 | 11/1996 |
| EP | 0887220 | 6/1998 |
| EP | 0987467 | 7/1999 |
| EP | 1122116 | 1/2001 |
| EP | 1 138 546 A2 | 10/2001 |
| EP | 1342930 A2 | 3/2003 |
| EP | 1365176 | 5/2003 |
| EP | 1555461 | 10/2003 |
| EP | 1469236 | 4/2004 |
| EP | 1666772 | 8/2005 |
| GB | 2170571 | 1/1986 |
| GB | 2 394 023 A | 4/2004 |
| JP | 43-11555 | 5/1968 |
| JP | 58-152938 | 9/1983 |
| JP | 61-024858 | 2/1986 |
| JP | 62-017631 | 1/1987 |
| JP | 62-80192 | 4/1987 |
| JP | 62-75414 | 5/1987 |
| JP | 62-110532 | 5/1987 |
| JP | 02-118269 | 5/1990 |
| JP | 03-172675 | 7/1991 |
| JP | 03-290030 | 12/1991 |
| JP | 4-266619 | 9/1992 |
| JP | 05-026065 | 2/1993 |
| JP | 05-039865 | 2/1993 |
| JP | 60-86631 | 12/1994 |
| JP | 08-061487 | 3/1996 |
| JP | 10-287150 | 10/1998 |
| JP | 11-082710 | 3/1999 |
| JP | 3044498 | 3/2000 |
| JP | 2000-205411 | 7/2000 |
| JP | 2001-050389 | 2/2001 |
| JP | 2001-146930 | 5/2001 |
| JP | 2001-173685 | 6/2001 |
| JP | 2001-280493 | 10/2001 |
| JP | 2002-067741 | 3/2002 |
| JP | 2002-243034 | 8/2002 |
| JP | 2003-329064 | 11/2003 |
| JP | 2005-282784 | 10/2005 |
| JP | 2006-017221 | 1/2006 |
| WO | WO 91/10979 | 7/1991 |
| WO | WO 98/24008 | 6/1998 |
| WO | WO 02/25131 | 3/2002 |
| WO | WO 2004/005743 | 1/2004 |
| WO | WO 2004/094177 | 11/2004 |

OTHER PUBLICATIONS

Co-Pending U.S. Appl. No. 11/514,386, filed Aug. 31, 2006. Title: Clutch Control Device and Vehicle.
Co-Pending U.S. Appl. No. 11/514,000, filed Aug. 31, 2006. Title: Automatic Shift Control Device and Vehicle.
Co-Pending U.S. Appl. No. 11/513,609, filed Aug. 31, 2006. Title: Automated Transmission Controller and Vehicle Including the Automated Transmission Controller.
Co-Pending U.S. Appl. No. 11/514,017, filed Aug. 31, 2006. Title: Automated Transmission Controller and Vehicle Including the Automated Transmission Controller.
Co-Pending U.S. Appl. No. 11/513,537, filed Aug. 31, 2006. Title: Automatic Gearshift Control Device and Vehicle.
Co-Pending U.S. Appl. No. 11/469,268, filed Aug. 31, 2006. Title: Clutch Actuator, Engine Unit, and Straddle Type Vehicle.
Co-Pending U.S. Appl. No. 11/469,310, filed Aug. 31, 2006. Title: Clutch Actuator, Engine Unit, and Straddle Type Vehicle.
Co-Pending U.S. Appl. No. 11/469,228, filed Aug. 31, 2006. Title: Clutch Actuator, Engine Unit, and Straddle Type Vehicle.
Co-Pending U.S. Appl. No. 11/469,252, filed Aug. 31, 2006. Title: Shift Actuator, Vehicle and Method of Integrating Vehicle.
Co-Pending U.S. Appl. No. 10/591,285, filed Aug. 31, 2006. Title: Riding Type Vehicle.
Co-Pending U.S. Appl. No. 10/591,560, filed Aug. 31, 2006. Title: Speed Change Controller for Straddle-Ride Type Vehicles.
Co-Pending U.S. Appl. No. 10/591,284, filed Aug. 31, 2006. Title: Actuation Force Transmission Mechanism and Straddle-Type Vehicle.
EP Search Report for EP06025732 completed Feb. 9, 2007 (correponding EP Application of FY53115).
EP Search Report for EP06025981 completed Feb. 16, 2007 (corresponding EP Application of FY53113).
EP Search Report for EP06025877 completed Feb. 12, 2007 (corresponding EP Application of FY53111).
EP Search Report for EP06025982 completed Feb. 6, 2007 (corresponding EP Application of FY52862).
EP Search Report for EP06025609 completed Feb. 5, 2007 (corresponding EP Application of FY53117).
EP Search Report for EP06025607 completed Feb. 5, 2007 (corresponding EP Application of FY53118).
EP Search Report for EP06025606 completed Feb. 5, 2007 (corresponding EP Application of FY53120).
EP Search Report for EP06025734 completed Feb. 8, 2007 (corresponding EP Application of FY52858).
Official Communication issued in corresponding European Patent Application 05765446, completed on Sep. 24, 2009.

* cited by examiner

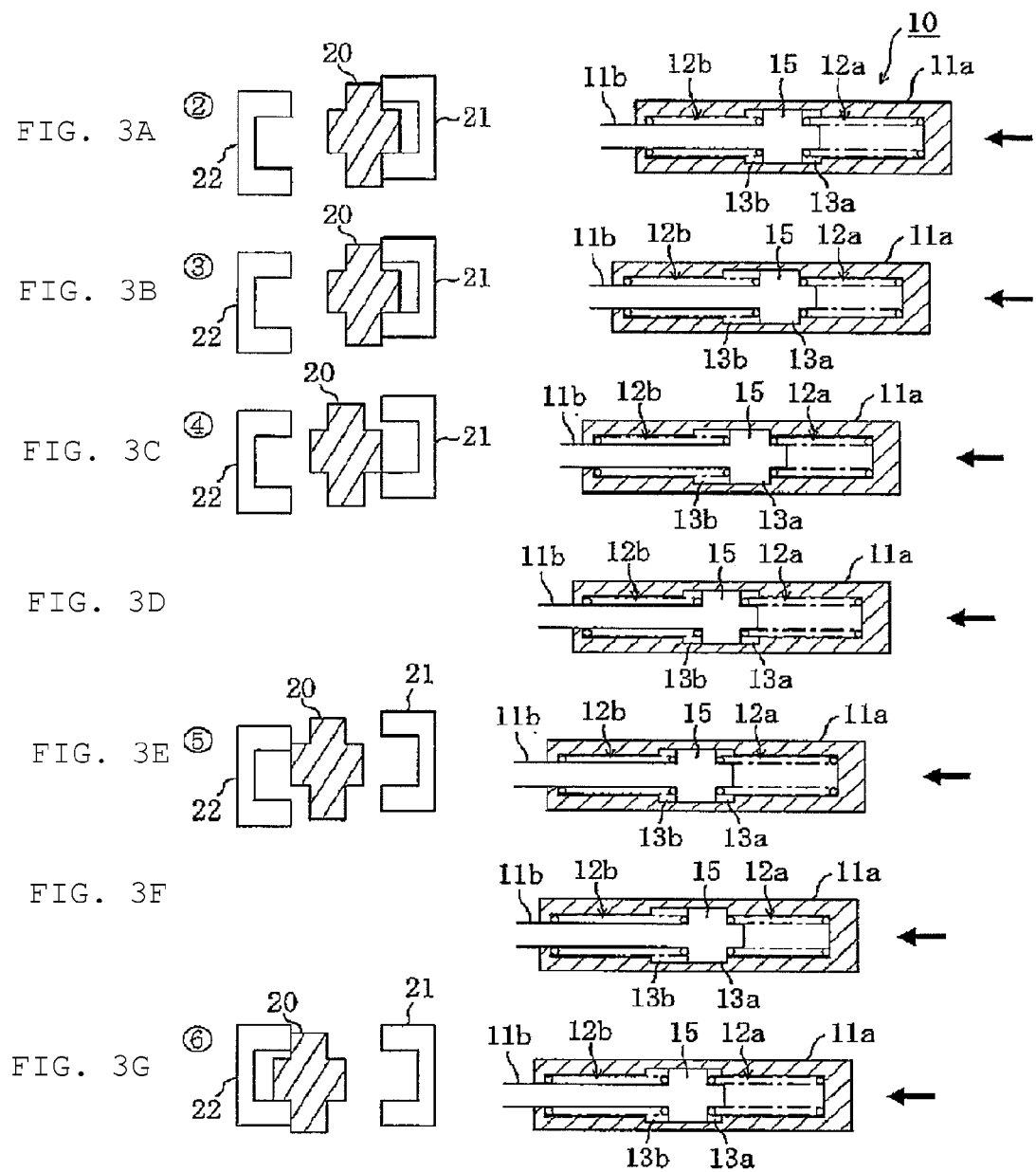

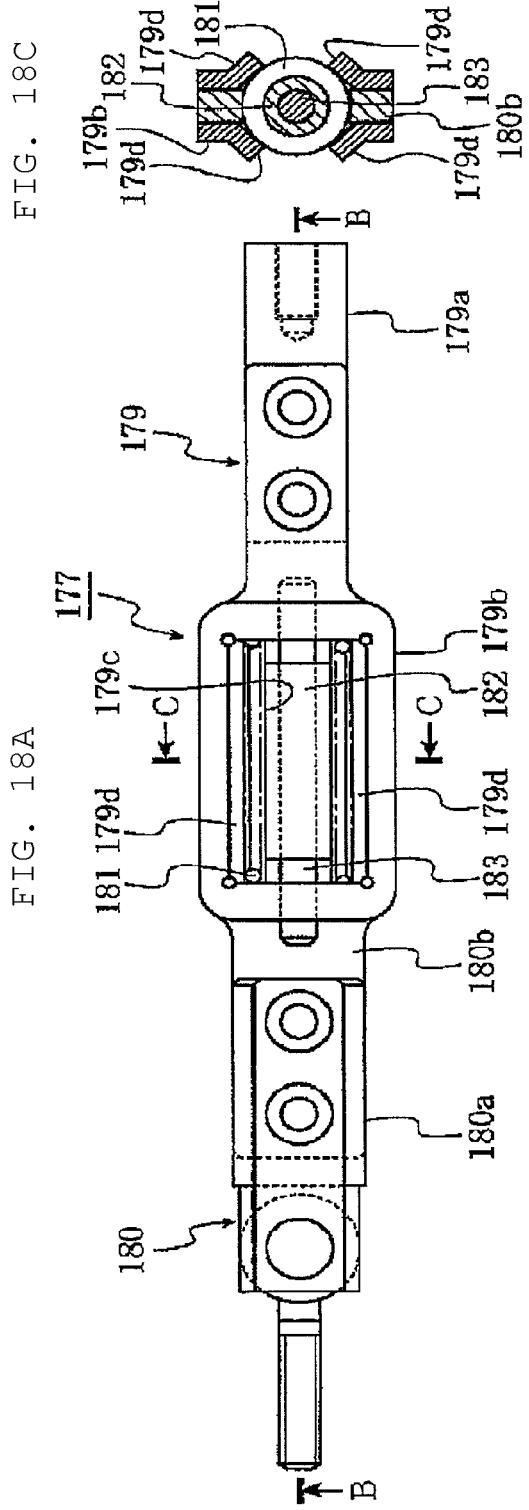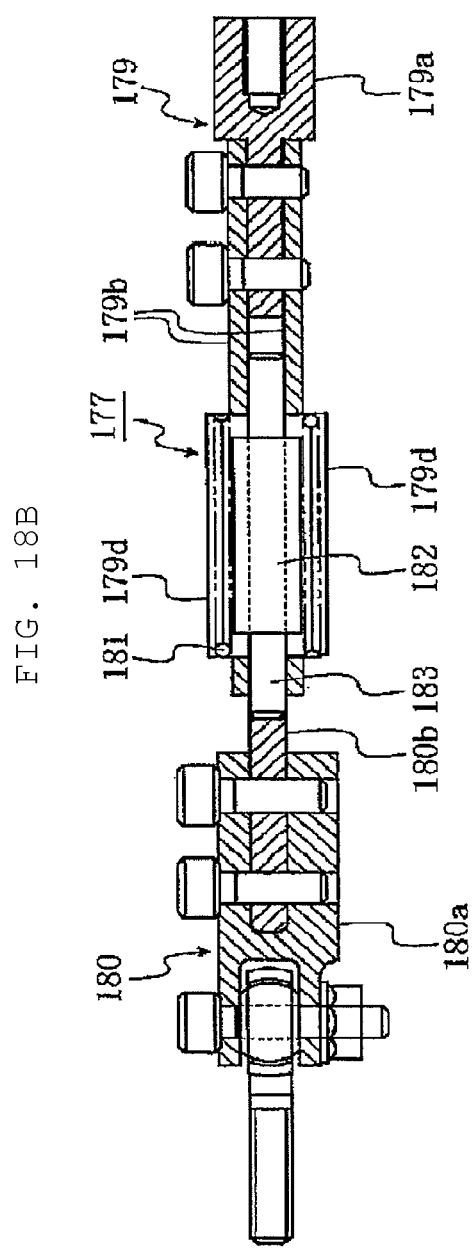

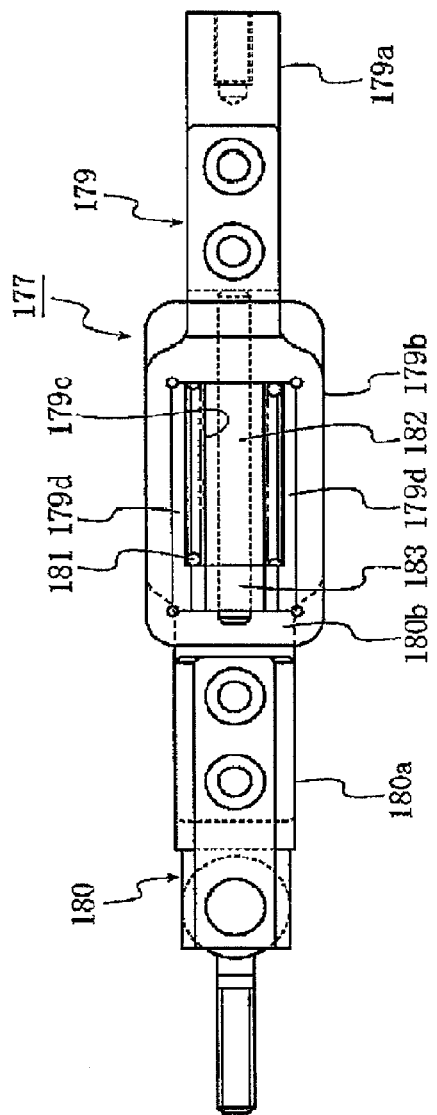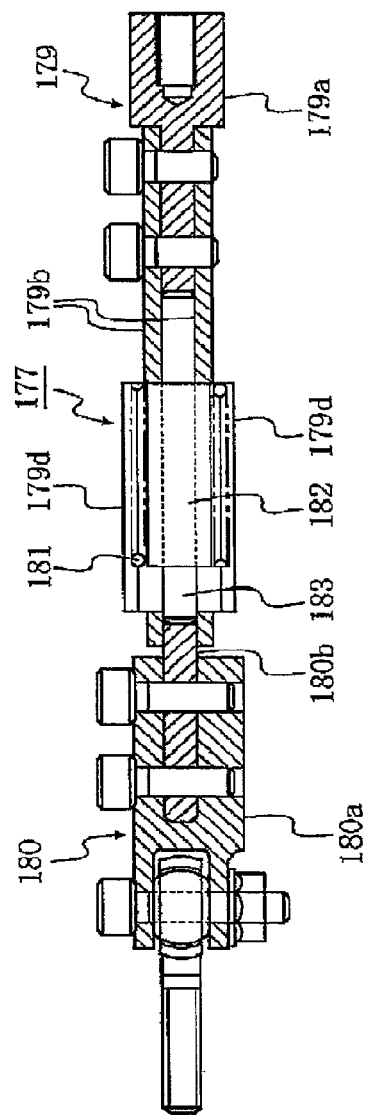
FIG. 19A
FIG. 19B

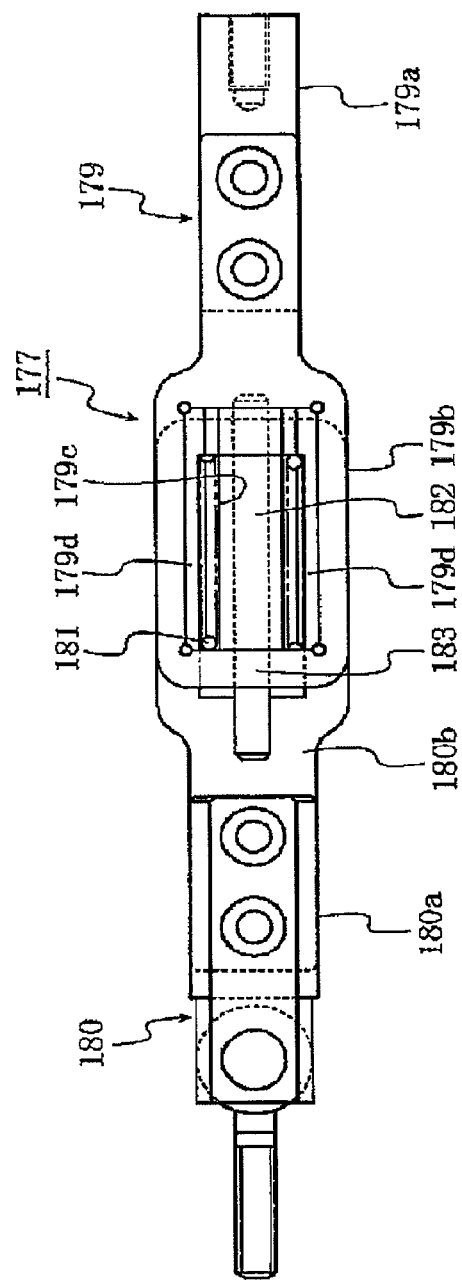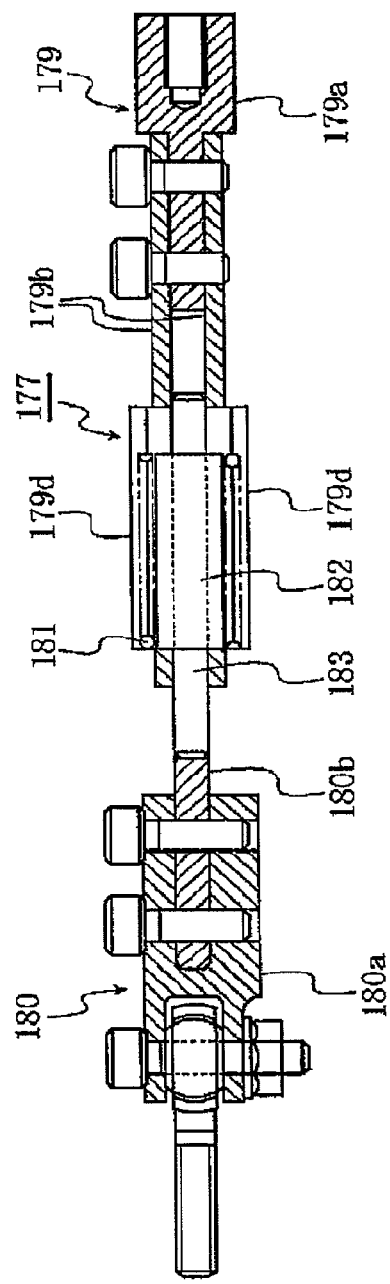
FIG. 20A
FIG. 20B

SHIFT CONTROL DEVICE FOR VEHICLE, AND VEHICLE INCLUDING THE SHIFT CONTROL DEVICE

CROSS-REFERENCE TO RELATED APPLICATIONS

This application is a U.S. National Phase of International Application No. PCT/JP2005/011803, filed Jun. 28, 2005, which claims priority to Japanese Application No. 2004-195632, filed Jul. 1, 2004, each of which is hereby incorporated by reference in its entirety.

BACKGROUND OF THE INVENTION

1. Field of the Invention

The present invention relates generally shift control devices for straddle-type vehicles, and more specifically, to a shift control device that is operative to electrically control a transmission of the straddle-type vehicle to change speeds.

2. Description of the Related Art

In some electric shift control devices, a conventional foot-operated shift pedal is not used, but an electric motor (shift actuator) is actuated based on a speed change command signal that is output from a shift switch to rotate the shift shaft of a transmission for shift change.

In the case of shift change using a foot-operated shift pedal, repeated shift operations may be required to complete the shift change if a dog in the transmission does not disengage or engage smoothly. However, with an electric shift control device, the shift change might not be made if a dog does not disengage or engage smoothly.

In an attempt to address this problem related to electric shift control devices, a feedback method has been proposed. According to this method, the angle of a shift cam is detected and fed back in order to adjust the operation angle of the shift actuator for ensuring that the dog properly and smoothly disengages and engages. Although beneficial, this method can be problematic due to slow shift speed and the complexity of the device.

This method is also problematic because in order to operate the shift actuator at a predetermined angle in a predetermined period, the shift actuator must keep operating even during abutment of the dog. Due to the abutment with the shift actuator, the dog may tend to rotate with the operation of the shift actuator. Although it is possible to prevent the dog from rotating with the operation of the shift actuator, this requires the interposition of an actuation force transmission mechanism, such as a spring mechanism between the shift actuator and the shift shaft. Further, if the load required to disengage the dog cannot be obtained with the spring, the dog cannot be disengaged. In addition, if the stroke amount of the shift actuator needs to be increased, the shift speed is made slower.

In view of the foregoing issues, Japanese Patent Document No. JP-B-3044498 discloses a technique for providing a lost motion mechanism constituted of an elastic member between the electric motor and the shift shaft. This lost motion mechanism is interposed between a speed reduction gear mechanism (which is positioned between the output shaft and the shift drum shaft of the electric motor) and the shift shaft in order to prevent the electric motor from being overloaded. Thus, instead of being applied to the shift actuator, any overload is applied to the elastic member and results in elastic deformation of the elastic member. Therefore, when the shift shaft is rotationally driven by the resilient force, the shift shaft can be rotationally driven smoothly, without the influence of the inertial mass of the speed reduction gear mechanism. Such a configuration tends to ensure smooth speed change shift operation.

Incidentally, albeit unrelated to electric shift control devices, Japanese Patent Document No. JP-Y-Sho 43-11555 discloses a technique for achieving smooth shift change using a foot-operated shift pedal. This reference teaches a coupling mechanism that is disconnected at a portion between the shift pedal and the shift shaft. Both the disconnected ends of the coupling mechanism are linked via an elastic member and have play equivalent to half the stroke of the shift pedal. With this structure, the dog can be disengaged with operation force of the shift pedal directly applied thereto, and can also be engaged always by the elastic force of the elastic member. This configuration tends to ensure smooth shift change for foot-operated shift pedals.

Despite the beneficial shift control devices described in Japanese Patent Document Nos. JP-B-3044498 and JP-Y-Sho 43-11555, the elastic members are disposed in the engine case, for example, in the case of the elastic member of JP-B-3044498, between a reduced speed output gear, which is located at the final speed reduction end of the speed reduction gear mechanism, and the shift shaft. In the case of JP-Y-Sho 43-11555, the elastic member is disposed between a pedal shaft and a change arm. Hence, an existing structure cannot be utilized and high maintenance may be required. Therefore, there is a need in the art for an actuation force transmission mechanism that allows smooth shift change and is compactly sized in order to mitigate any restriction on installation location and enable easy installation.

SUMMARY OF THE INVENTION

As described herein, several aspects of the present invention relate to a shift control device for a straddle-type vehicle for performing shift control. In accordance with various implementations, a shift actuator can be stroked by a predetermined amount to rotate a shift shaft, and a dog can be engaged and disengaged by the rotation of the shift shaft. The embodiments described of the shift control device herein can thus provide for a smooth-shifting straddle-type vehicle incorporating the actuation force transmission mechanism.

The shift control device can include a transmission mechanism comprising a biasing mechanism and a stopper mechanism. The transmission mechanism can also include a first coupling part and a second coupling part coupled for movement relative to each other. The biasing mechanism can be configured for urging the first and second coupling parts toward a neutral position. The stopper mechanism can be configured for stopping the relative movement of the first or second coupling part when the first or second coupling part is moved relatively from the neutral position against urging force of the biasing mechanism. The transmission mechanism can be disposed outside an engine case and be interposed between the shift actuator and the shift shaft.

In a preferred embodiment, the transmission mechanism can be arranged such that, when resistive force acts against movement of the transmission mechanism, one of the first and second coupling part moves relatively against the urging force of the biasing mechanism until the respective coupling part is stopped by the stopper mechanism. Further, the first and second coupling parts can then move together.

In yet another embodiment, the biasing mechanism can include a first biasing member disposed in the first coupling part and a second biasing member disposed in the second coupling part. The stopper mechanism can include a first stopper mechanism for stopping relative movement of the first coupling part and a second stopper mechanism for stopping relative movement of the second coupling part.

Preferably, the urging force of the first biasing member and the urging force of the second biasing member are equal to each other.

In accordance with another embodiment, the first and second coupling parts can be coupled for movement relative to each other in sliding directions (e.g., linearly).

In accordance with yet another embodiment, the biasing mechanism can include a compression spring.

In accordance with yet another embodiment, the first and second coupling parts can be coupled for movement relative to each other in rotating directions.

In accordance with yet another embodiment, the biasing mechanism can include a leaf-type spring. In a preferred embodiment, the leaf spring has an elongated rod-like shape (that is, configured substantially as a needle).

In accordance with yet another embodiment, the transmission mechanism can be disposed on the shift shaft.

In accordance with yet another embodiment, the transmission mechanism can be disposed on a rotation axis of a gear of a speed reduction mechanism coupled to the shift actuator.

In accordance with yet another embodiment, the shift actuator can be coupled to the shift shaft via a coupling mechanism for transmitting actuation force of the shift actuator. In addition, the transmission mechanism can be held by the coupling mechanism.

In accordance with yet another embodiment, the transmission mechanism can be provided in a case held by the coupling mechanism.

In accordance with yet another embodiment, the shift actuator can be coupled to the shift shaft via a coupling mechanism for transmitting actuation force of the shift actuator; and the coupling mechanism is of adjustable length.

Embodiments of the shift control device for a straddle-type vehicle can therefore allow smooth shift change even when disengagement of the dog is difficult or dog abutment occurs during engagement of the dog.

Finally, embodiments of the transmission mechanism described herein can be disposed outside an engine case that houses the shift shaft. In this way, the transmission mechanism can be provided without the need to modify the inside of the engine case and can be easily maintained.

BRIEF DESCRIPTION OF THE DRAWINGS

FIGS. 3A to 3G show a specific structure and operation of the actuation force transmission mechanism in accordance with an embodiment the present invention.

FIG. 18 shows an actuation force transmission mechanism according to yet another embodiment of the present invention in a normal state, in which FIG. 18A is a plan view of an embodiment of the actuation force transmission mechanism, FIG. 18B is a sectional view taken along the line B-B of FIG. 18A, and FIG. 18C is a sectional view taken along the line C-C of FIG. 18A.

FIG. 19 shows the actuation force transmission mechanism according to the another embodiment of the present invention in the shortened state, in which FIG. 19A is a plan view of the actuation force transmission mechanism, and FIG. 19B is a sectional view corresponding to FIG. 19A.

FIG. 20 shows the actuation force transmission mechanism according to the another embodiment of the present invention in an expanded state, in which FIG. 20A is a plan view of the actuation force transmission mechanism, and FIG. 20B is a sectional view corresponding to FIG. 20A.

DETAILED DESCRIPTION OF THE PREFERRED EMBODIMENT

With reference now to the drawings, wherein the figures are provided for purposes of illustrating preferred embodiments of the present invention and not for purposes of limiting the same, FIGS. 1-3 illustrate embodiments of a shift control device for a straddle-type vehicle. A basic description of the actuation force transmission mechanism will be provided first, followed by a detailed description of specific structures utilizable in accordance with embodiments of the present invention.

Figure 1A:
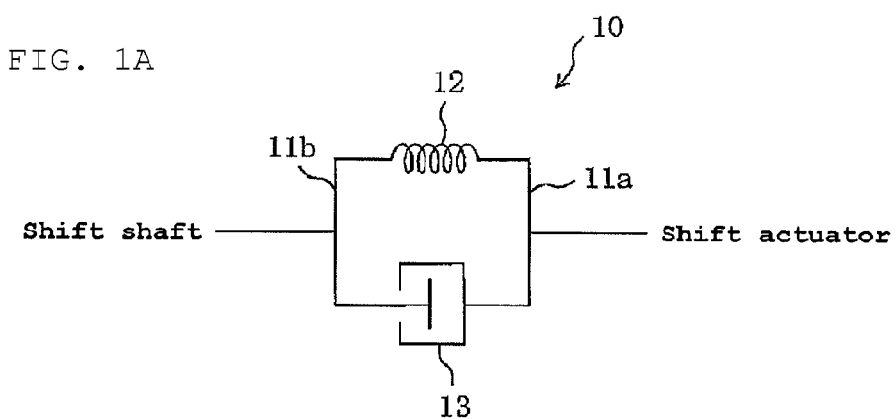
FIGS. 1A and 1B are schematic diagrams showing the basic structure of a shift control device for a straddle-type vehicle, which includes an actuation force transmission mechanism, configured according to embodiments of the present invention.
Figure 1B:
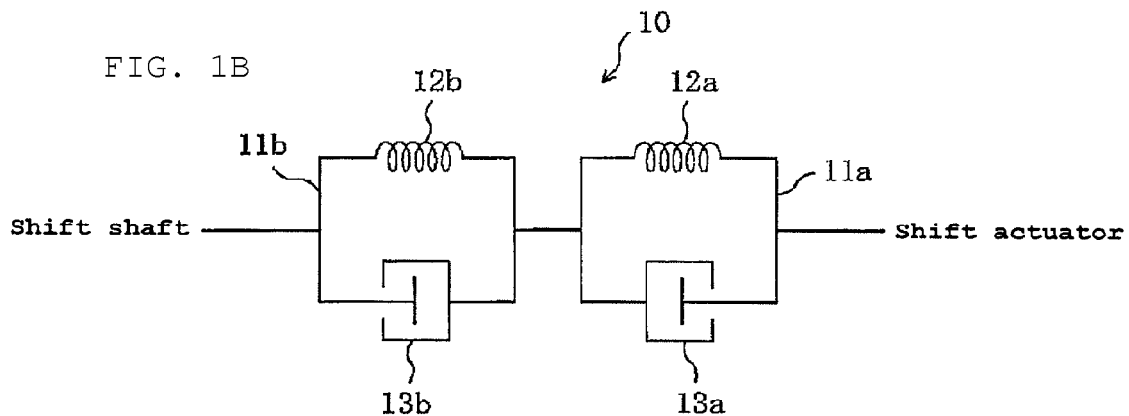

FIGS. 1A and 1B are conceptual diagrams showing the basic structure of an embodiment of the shift control device for a straddle-type vehicle.

FIG. 1A is a conceptual diagram showing a transmission mechanism 10 interposed between a shift actuator and a shift shaft in the shift control device in accordance with an embodiment of the present invention. Normally, the shift actuator can be coupled to the shift shaft through a coupling rod or the like. The shift actuator can be stroked by a predetermined amount to rotate the shift shaft. The rotation of the shift shaft can engage and disengage a dog to control shift change. In an embodiment, the transmission mechanism 10 can be disposed at an intermediate portion of the coupling rod.

As shown in the embodiment illustrated in FIG. 1A, the transmission mechanism 10 can include a first coupling part 11a and a second coupling part 11b coupled for movement relative to each other. The transmission mechanism 10 can also include a biasing mechanism 12 for urging the first and second coupling parts 11a, 11b toward a neutral position. Finally, the transmission mechanism 10 can also include a stopper mechanism 13 for stopping relative movement of the first or second coupling part 11a, 11b when they move relative to each other from the neutral position against an urging force of the biasing mechanism 12.

Another embodiment of the transmission mechanism 10 shown in FIG. 1B has a structure similar to that shown in FIG. 1A, but is provided with a biasing mechanism 12 and a stopper mechanism 13 for each of the first and second coupling parts 11a, 11b. Thus, the first coupling part 11a can be provided with a first biasing member 12a and a first stopper mechanism 13a for stopping relative movement of the first coupling part 11a. In like manner, the second coupling part 11b can be provided with a second biasing member 12b and a second stopper mechanism 13b for stopping relative movement of the second coupling part 11b. As discussed below, the biasing mechanism can be a resilient component variously sized and configured to assist in the return the first and second coupling parts 11a, 11b to or from the neutral position. Further, the stopper can also be various sized and configured to assist in limiting the movement of the first and second coupling parts 11a, 11b. The operation of the actuation force transmission mechanism 10 shown in FIG. 1B is similar to that of the actuation force transmission mechanism 10 shown in FIG. 1A, and hence only the latter is described here.

According to implementations of the present invention, the operation of the above transmission mechanism 10 is now described with reference to FIGS. 2A to 2E.

FIGS. 2A to 2E show how the transmission mechanism 10 can operate when the shift actuator is stroked by a predetermined amount.

Figure 2A:
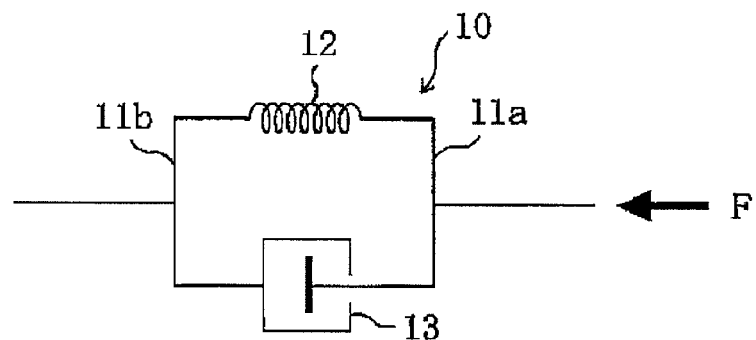
FIGS. 2A to 2E show how the transmission mechanism of FIG. 1A can operate when a shift actuator is stroked by a predetermined amount in accordance with an implementation of the present invention.

FIG. 2A shows a state in which the first coupling part 11a and the second coupling part 11b are held at the neutral position of the transmission mechanism 10 by the urging force of the biasing mechanism 12. After the shift actuator is stroked by a predetermined amount and a shift up or a shift down is completed, the shift actuator can return to a predetermined position. If the first and second coupling parts 11a, 11b deviate from the neutral position at that time, however, the dog can become disengaged and may subsequently be engaged at deviated positions by the rotation of the shift shaft at the next shift up or shift down. This condition may hinder smooth shift change. However, the urging force of the biasing mechanism 12 can be preset such that the first and second coupling parts 11a, 11b can be prevented from deviating from the neutral position.

Figure 2B:
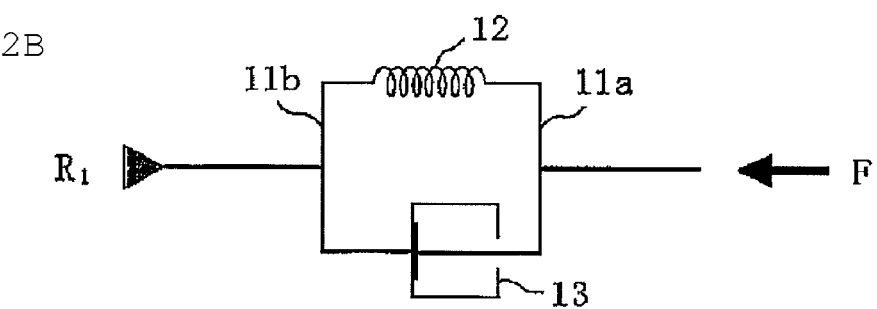

With reference still to FIGS. 2A-E, when the shift actuator in this state is actuated in response to a gear change command signal and starts being stroked by a predetermined amount, an actuation force F1 in the direction of the arrow (labeled F1) can be applied to the transmission mechanism 10 from the shift actuator side (the right side of the drawing) as shown in FIG. 2A. At this time, when some resistive force R1 (which will be described specifically later) acts against movement of the transmission mechanism 10 on the shift shaft side (the left side of the drawing) of the transmission mechanism 10, the biasing mechanism 12 (e.g. a compression spring) can be compressed, and as a result, the first coupling part 11a can move relatively from a neutral position, as shown in FIG. 2A, to a position shown in FIG. 2B. As also shown, the first coupling part 11a can move relatively against the biasing mechanism 12 until the movement of the first coupling part 11a is stopped by action of the stopper mechanism 13, as shown in FIG. 2B.

Figure 2C:
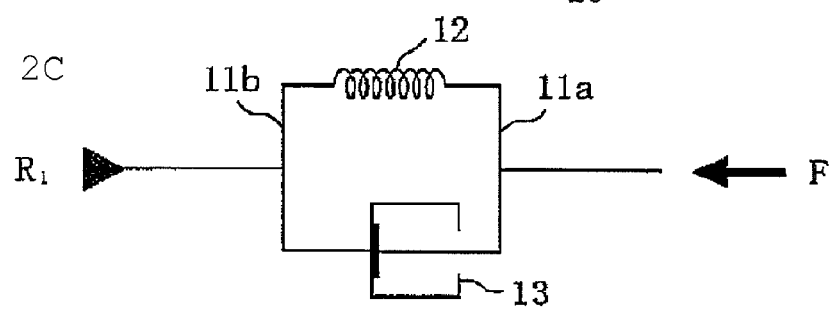

When the movement of the first coupling part 11a relative to the second coupling part 11b is stopped, the first coupling part 11a and the second coupling part 11b can move together as shown in FIGS. 2B-C. At this time, the transmission mechanism 10 can move in a "rigid" state and can therefore be enabled to move against the resistive force R1 to effectively rotate the shift shaft.

Figure 2D:
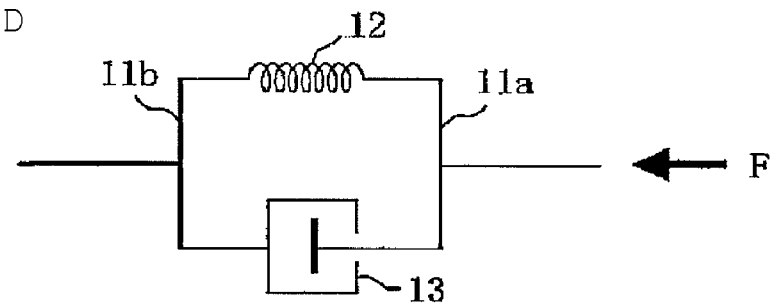

When the resistive force R1 is no longer applied against the movement of the transmission mechanism 10, as shown in FIG. 2D, the urging force of the biasing mechanism 12 can urge the first coupling part 11a toward the neutral position, and the transmission mechanism 10 can keep moving as the shift actuator is stroked.

Figure 2E:
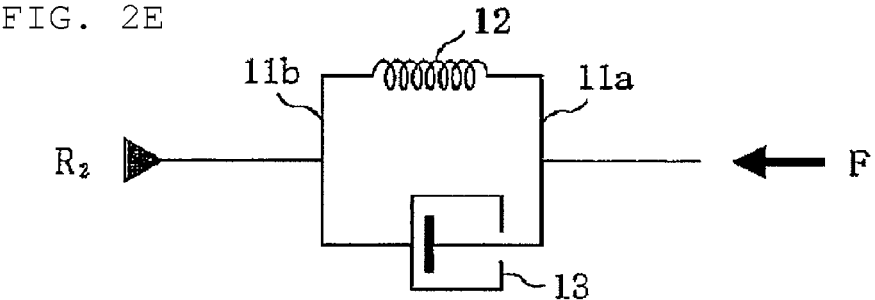

Then, when some resistive force R2 (which will be described specifically later) acts against the movement of the transmission mechanism 10 again, the biasing mechanism 12 can be compressed as shown in FIG. 2E, and as a result, the first coupling part 11a can move relatively against the biasing mechanism 12 to a point before it is stopped by the stopper mechanism 13 in the same way as in FIG. 2B. When the relative movement of the first coupling part 11a is stopped, the second coupling part 11b can be urged by the biasing mechanism 12 against the resistive force R2. Without the resistive force R2, the second coupling part 11b can be moved by the urging force of the biasing mechanism 12.

As described above, when some resistive force acts against movement of the transmission mechanism 10 in which the first coupling part 11a and the second coupling part 11b are coupled to each other, the biasing mechanism 12 and the stopper mechanism 13 can work in conjunction with each other to relatively move the first coupling part 11a (or the second coupling part 11b) for a certain period in order to relieve the resistive force. After the certain period, the first coupling part 11a and the second coupling part 11b can move together to allow the actuation force of the shift actuator to act directly on the shift shaft.

The above description describes a typical example of the operation of the transmission mechanism 10. The operation of the transmission mechanism 10 can vary depending on the magnitude and duration of resistive force which acts on the transmission mechanism 10, the stroke length of the shift actuator, etc.

For example, in the case where the resistive force R1 is applied to the transmission mechanism 10 of the above example for only a short period, the compression of the biasing mechanism 12 may not move the first coupling part 11a far enough relative to the second coupling part 11b to cause the first coupling part 11a to be stopped by the stopper mechanism 13. Instead, the first coupling part 11a can return toward the neutral position when the resistive force R1 is no longer applied.

In the case where the shift actuator is stroked in the opposite direction, the transmission mechanism 10 can basically perform the same operation as shown in FIGS. 2A to 2E. In such as case, the transmission mechanism 10 could have a symmetrical structure with respect to the neutral position.

In the operation of the transmission mechanism 10 of the above example, the first coupling part 11a and the second coupling part 11b can be coupled so as to be movable relative to each other in sliding directions. However, the first coupling part 11a and the second coupling part 11b can also be coupled so as to be movable relative to each other in rotating directions.

The foregoing describes exemplary conceptual structures and operations of embodiments of the transmission mechanism 10. Now, exemplary specific structures and operations of embodiments of the transmission mechanism 10 are described in association with actual engagement and disengagement of the dog with reference to FIGS. 3 and 4.

Figure 4:
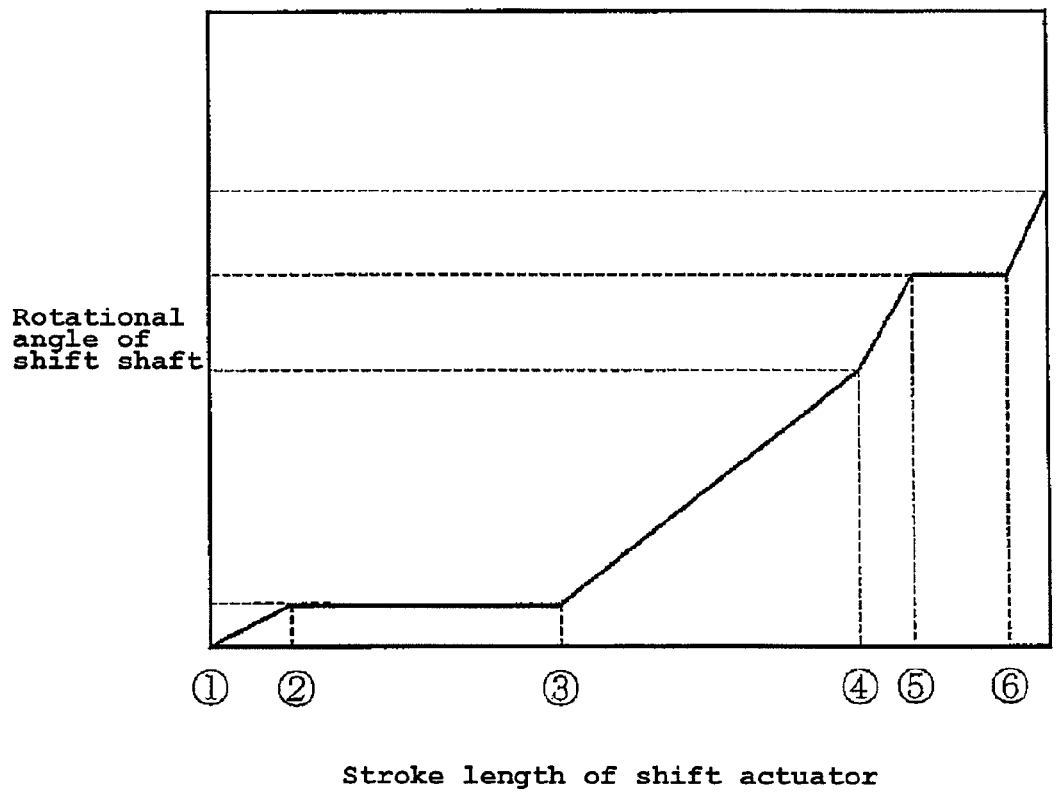
FIG. 4 is a graph showing the rotational angle of a shift shaft versus the stroke length of the shift actuator in accordance with an embodiment of the present invention.

FIGS. 3A to 3G show exemplary operation of an embodiment of the transmission mechanism 10 and exemplary operation of an embodiment of a dog mechanism. FIG. 4 shows the rotational angle of the shift shaft versus the stroke length of the shift actuator, according to an implementation of the present invention. According to one embodiment, the transmission mechanism 10 can have first and second coupling parts that each have an urging mechanism and a stopper mechanism. However, its basic operation is the same as a transmission mechanism with one biasing mechanism and one stopper mechanism.

The right side of FIG. 3A shows an embodiment of the transmission mechanism 10 with the first coupling part 11a and the second coupling part 11b held in the neutral position. The left side of FIG. 3A shows an embodiment of the dog mechanism with a dog 20 engaged with a gear 21.

As shown in FIG. 3A, the first coupling part 11a of the transmission mechanism 10 can be inserted into an opening of, and slideably coupled to the second coupling part 11b. A first coil spring 12a can act as a biasing member, and along with a first stopper member 13a, can be disposed in an opening 16a of the first coupling part 11a (see FIG. 5B). Likewise, a second coil spring 12b can act as a biasing member, and along with a second stopper member 13b, can be disposed in an opening 16b of the second coupling part 11b.

When a gear change command signal is input to the shift actuator in this state, the shift actuator can subsequently be stroked by a predetermined amount. With reference now to FIG. 4, the shift shaft normally has "play" and can thus rotate by the play when the shift actuator is first stroked (represented by the diagonal line on the graph intermediate numbers 1 and 2 on the horizontal axis of FIG. 4).

As the shift actuator is further stroked, disengagement of the dog can start. The frictional force of the dog 20 in engagement with the gear 21 can act as resistive force against the movement of the shift actuator as shown in FIG. 3B. Thus, according to an implementation of the present invention, the transmission mechanism 10 interposed between the shift actuator and the shift shaft can operate in such a way that the first coil spring 12a disposed in the first coupling part 11a can become compressed. As a result, the second coupling part 11b can move relatively from the neutral position.

The second coupling part 11b can move relatively against the first coil spring 12a until the first stopper mechanism 13a comes in contact with the sidewall of a support member 15 of the second coupling part 11b. While the support member 15 abuts the first stopper mechanism 13a, the first coupling part 11a and the second coupling part 11b are in a "rigid" state; the shift shaft does not rotate as the shift actuator is stroked during this stage of stroke (represented by the horizontal line on the graph intermediate numbers 2 and 3 on the horizontal axis of FIG. 4).

Furthermore, when the relative movement of the second coupling part 11b is stopped, the first coupling part 11a and the second coupling part 11b can move together as shown in FIG. 3C. At this time, since the transmission mechanism 10 moves in as it were a "rigid" state, the actuation force of the shift actuator is applied directly to the shift shaft and exceeds the above-described frictional force so that the dog 20 disengages from the gear 21 during this stage of stroke (represented by the diagonal line on the graph intermediate numbers 3 and 4 on the horizontal axis of FIG. 4).

When the dog 20 is completely disengaged, frictional force of the dog 20 with gear 21 no longer exists. Thus, the urging force of the first coil spring 12a can then return the second coupling part 11b toward the neutral position as shown in FIG. 3D. After the dog 20 is disengaged, the shift shaft can rotate with almost no resistive force acting against the movement of the transmission mechanism 10 (represented by the diagonal line on the graph intermediate numbers 4 and 5 on the horizontal axis of FIG. 4).

Then, as shown in FIG. 3E, resistive force due to abutment of the dog acts against the movement of the shift actuator when the dog 20 engages with a gear 22. Again, as shown in FIG. 3F, the first coil spring 12a disposed in the first coupling part 11a can become compressed, and the second coupling part 11b can then move relatively from the neutral position. In the abutment of the dog 20, small urging force of the first coil spring 12a acts on the dog 20, and allows the dog 20 to engage with the gear 22 smoothly (represented by the horizontal line on the graph intermediate numbers 5 and 6 on the horizontal axis of FIG. 4). Once the dog 20 is completely engaged with the gear 22, there no longer exists resistive force as shown in FIG. 3G. Thus, the urging force of the first coil spring 12a can return the second coupling part 11b toward the neutral position.

Preferably, a gap can be provided so that the second coupling part 11b will move relatively not to be stopped by the first stopper mechanism 13a when the shift actuator is fully stroked and in the abutment of the dog, as shown in FIG. 3F.

As described above, in an embodiment of the shift control device, the transmission mechanism 10 can include a first coupling part 11a and a second coupling part 11b, and can be coupled so as to provide movement relative to each other. Further, the transmission mechanism 10 can be interposed between the shift actuator and the shift shaft. When the shift actuator is stroked by a predetermined amount, the dog can be compulsorily disengaged as the first and second coupling parts 11a, 11b are moved together by means of the stopper mechanism 13 (13a, 13b). Further, the dog can be engaged (in the abutment of the dog) as the one of the first and second coupling part 11a, 11b is moved relatively against the urging force of the biasing mechanism 12 (12a, 12b). This can facilitate smooth shift change.

In the above description, the dog can be disengaged as the first and second coupling parts move together, such as when the frictional force of the dog is great. However, it should be understood that the dog can be successfully disengaged as one of the first and second coupling parts moves relatively, such as when the frictional force of the dog is small.

According to an implementation, the transmission mechanism 10 described above has an independent structure and hence can be disposed outside an engine case which houses the shift shaft. In this way, the transmission mechanism 10 can be provided without the need to modify the inside of the engine case and can be easily maintained.

In addition, the transmission mechanism 10 described above can be easily disposed outside the engine case. For example, the transmission mechanism 10 can be held by a coupling mechanism (a mechanism for transmitting actuation force of the shift actuator to the shift shaft; for example, a coupling rod, a speed reduction mechanism, etc.) that can be coupled to the shift actuator and the shift shaft. Further, the transmission mechanism 10 described above can be effectively protected from water and dust by disposing it in a case held by the coupling mechanism.

The shift actuator can be coupled to the shift shaft via a coupling mechanism of adjustable length for transmitting actuation force of the shift actuator.

In the case where the urging forces of the first and second coil springs 12a, 12b are the same, the neutral position can be easily set. However, if the urging forces are different, the neutral position should be set carefully. With reference now to FIG. 5, description will be made of how the neutral position can be set using coil springs 12a, 12b that have different urging forces.

Figure 5A:
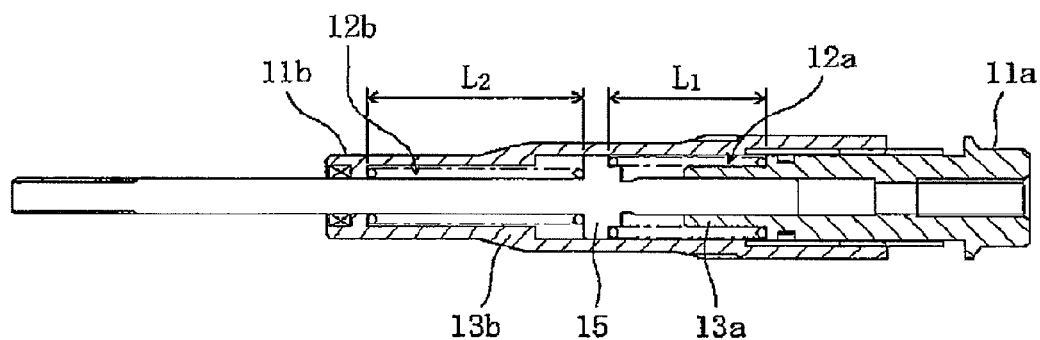
FIG. 5 shows how a neutral position can be set using coil springs of different urging forces in accordance with an embodiment of the present invention.
Figure 5B:
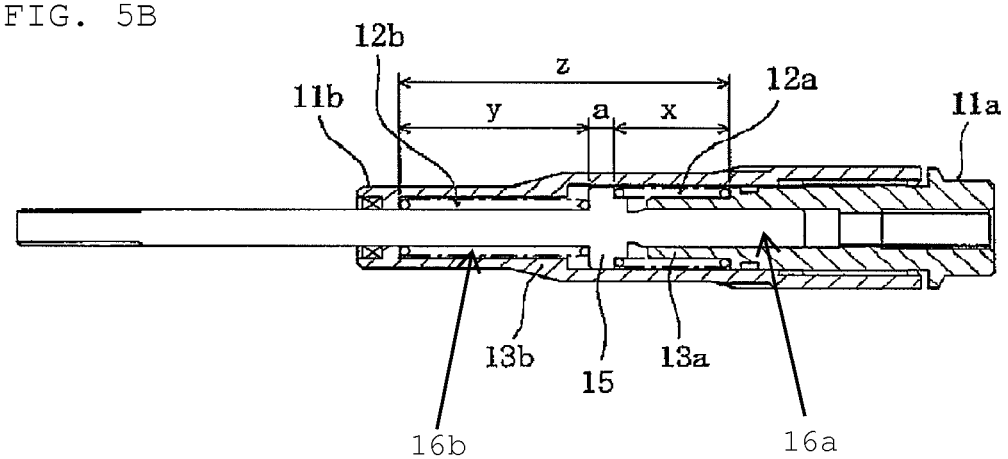

As shown in FIG. 5A, the free length of the first coil spring 12a (spring constant: N1) provided in the first coupling part 11a is defined as L1, and the free length of the second coil spring 12b (spring constant: N2) provided in the second coupling part 11b is defined as L2. Assuming that the first coupling part 11a and the second coupling part 11b of FIG. 5B are in the neutral position, and also the lengths of the first coil spring 12a and the second coil spring 12b are respectively x and y, the following equations hold true:

$$x+y+a=z \quad (1)$$

$$N1.\text{times}.(L1-x)=N2.\text{times}.(L2-y) \quad (2)$$

The length x of the first coil spring 12a and the length y of the second coil spring 12b can be determined by solving these simultaneous equations (1), (2).

The basic structure of the shift control device for a straddle-type vehicle according to embodiments of the present invention has been described above. Hereinafter, specific structures and operations of various embodiments of the shift control device will be described in detail with reference to FIGS. 6 to 23.

Figure 6:
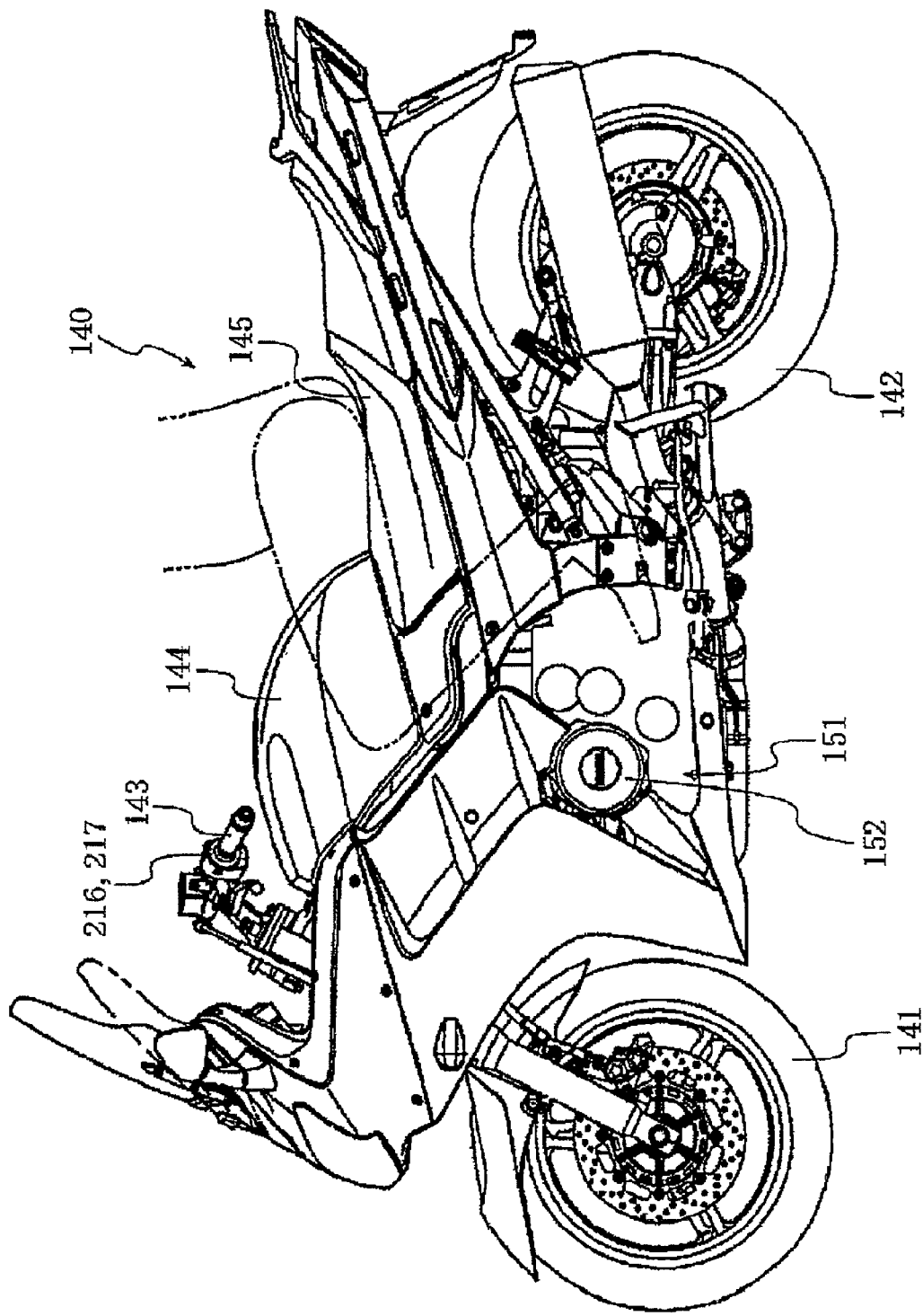
FIG. 6 is a side view of a two-wheeled motor vehicle in accordance with an embodiment of the present invention.

FIGS. 6 to 17 show a specific structure of the shift control device according to an embodiment of the present invention. In FIG. 6, reference numeral 140 denotes a two-wheeled motor vehicle as a "straddle-type vehicle", which can be provided with a front wheel 141 on its front side, a rear wheel 142 on its rear side, a fuel tank 144 in rear of handlebars 143, a seat 145 in rear of the fuel tank 144, and an engine 151 supported by a body frame below the fuel tank 144 and the seat 145.

A transmission (not shown) can be disposed in an engine case 152 for the engine 151. The transmission can have four to six speeds and adopts a dog clutch. Power from a crankshaft of the engine 151 can be transmitted to a main axle, and then to a drive axle via gears and dogs for respective speeds.

Figure 9:
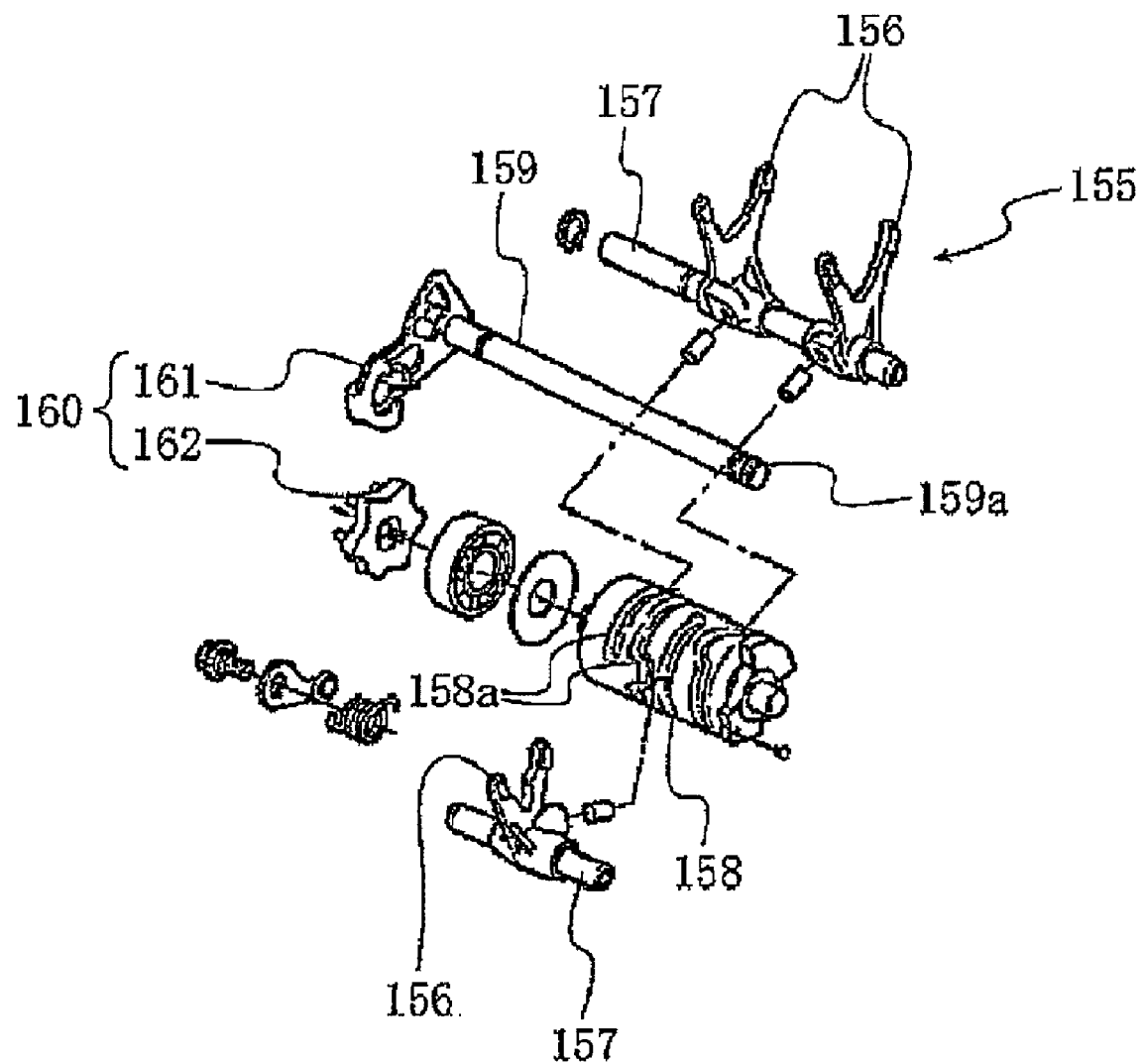
FIG. 9 is an exploded perspective view of a transmission mechanism in accordance with an embodiment of the present invention.
Figure 10:
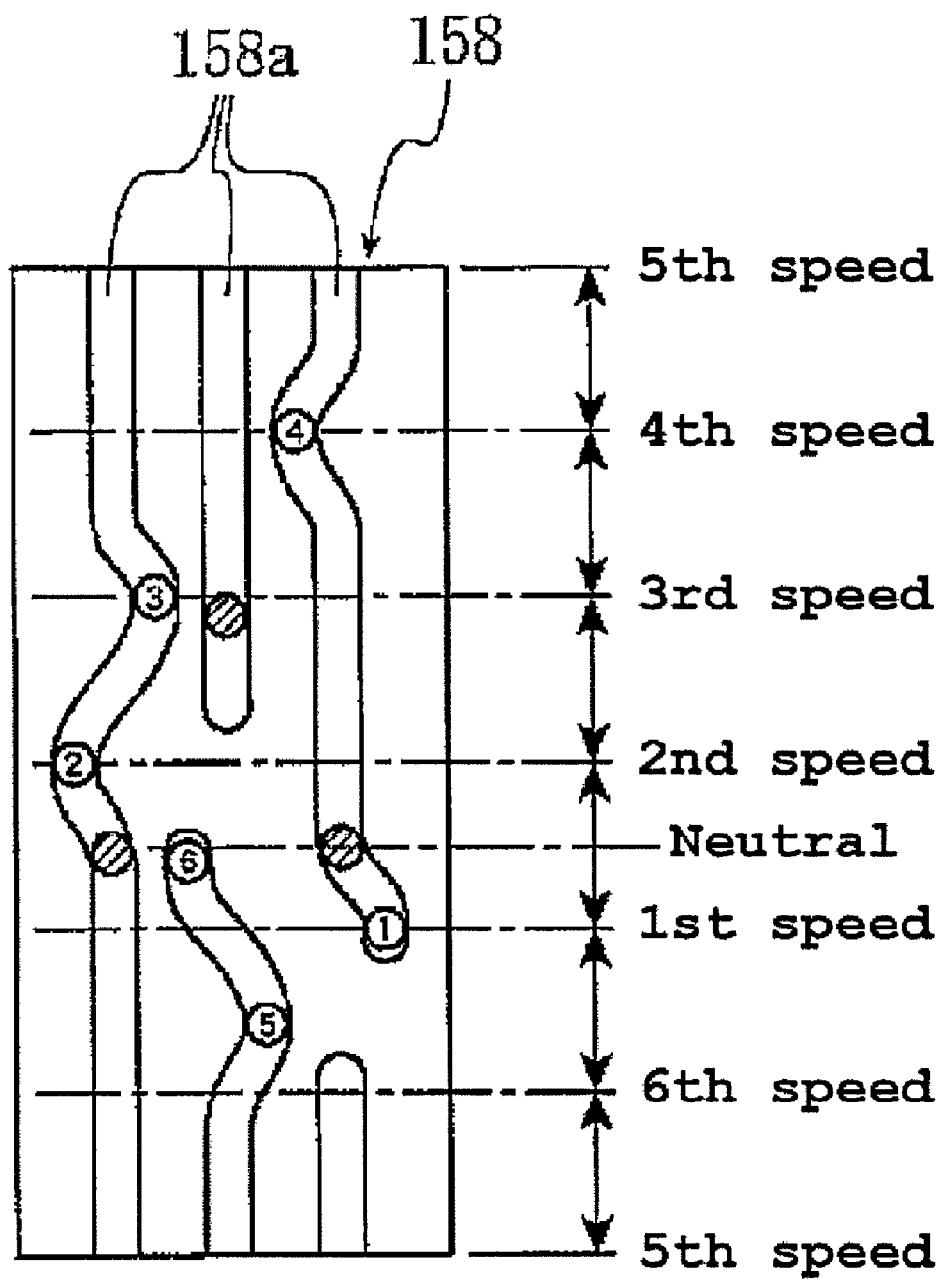
FIG. 10 shows the developed shape of grooves in a shift cam in accordance with an embodiment of the present invention.

Speed change operation of the transmission can be achieved by a speed change mechanism 155, an embodiment of which is shown in FIG. 9. As shown in FIG. 9, the speed change mechanism 155 can include shift forks 156 for regularly moving slide gears of the transmission, slidably mounted on a slide rod 157, and a rotatable shift cam 158 for sliding the shift forks 156.

Cam grooves 158a can be formed on the periphery of the shift cam 158. When developed, the cam grooves 158a can be formed as shown in the exemplary embodiment of FIG. 10. The shift forks 156 can be adapted to slide along the cam grooves 158a.

According to an embodiment, the shift cam 158 can rotate via a ratchet mechanism 160 as a shift shaft 159 rotates. The ratchet mechanism 160 can be configured to provide a ratchet function for both forward and reverse directions to change one gear at a time. For example, the ratchet mechanism 160 can rotate the shift cam 158 with constant intervals (such as by a constant angle) to move the shift forks 156 regularly. A shift arm 161 of the ratchet mechanism 160 transmits rotation of the shift shaft 159, and can also restrict the stroke of shift shaft 159 in order to prevent the shift cam 158 from overrunning. A stopper plate 162 of the ratchet mechanism 160 can be utilized to keep the shift cam 158 in specified positions.

The shift shaft 159 can move rotationally in a predetermined direction through a device such as described below.

Figure 7:
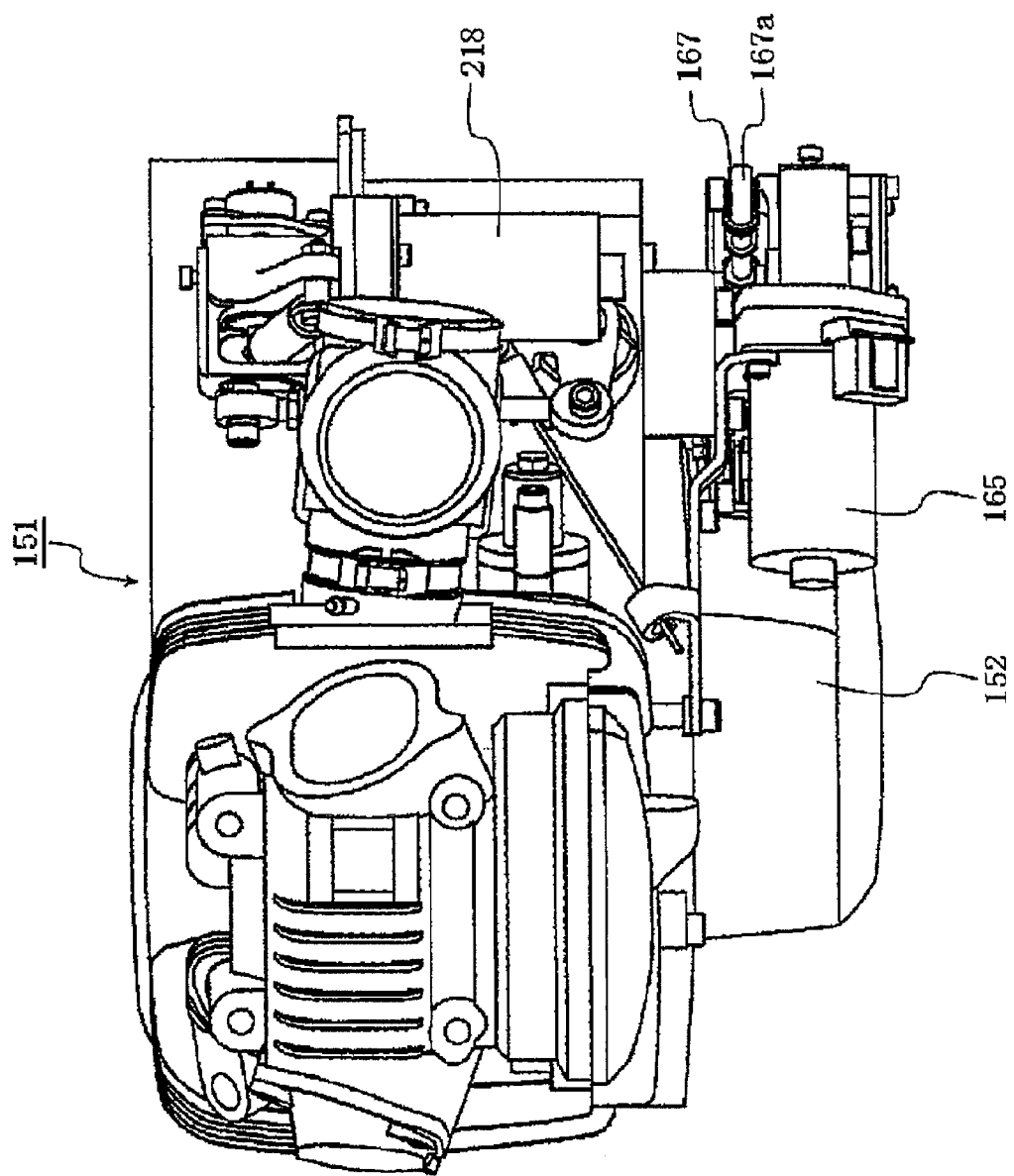
FIG. 7 is a plan view of an engine provided with the shift actuator in accordance with an embodiment of the present invention.

With reference now to the embodiment illustrated in FIG. 7, a distal end 159a of the shift shaft 159 can project from the engine case 152 to the outside of the engine, and can be provided with an actuation force transmission mechanism 164. The shift shaft 159 can be rotated by driving force of the shift actuator 165 via the actuation force transmission mechanism 164.

Figure 8:
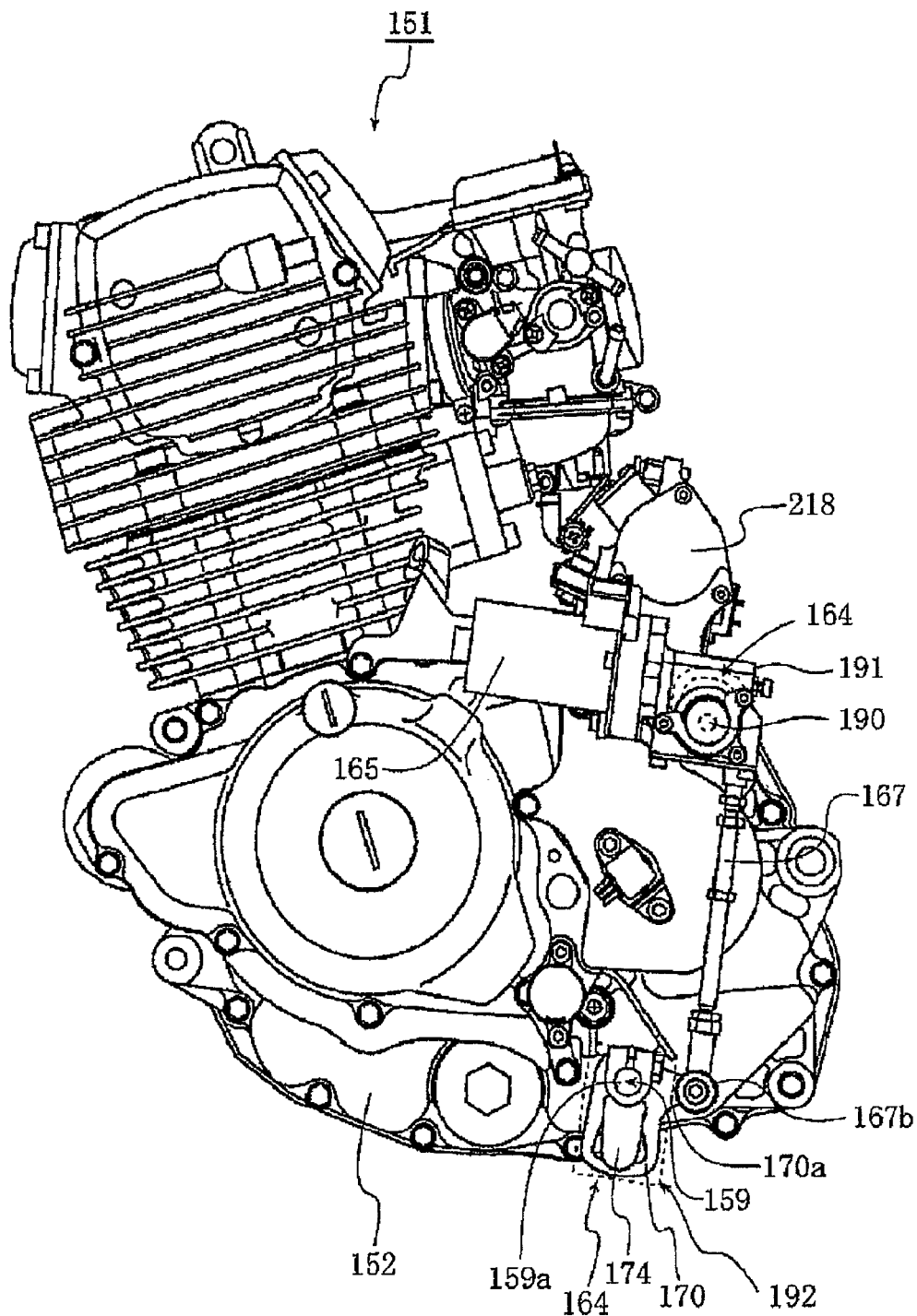
FIG. 8 is a side view of the engine provided with the shift actuator in accordance with an embodiment of the present invention.
Figure 11:
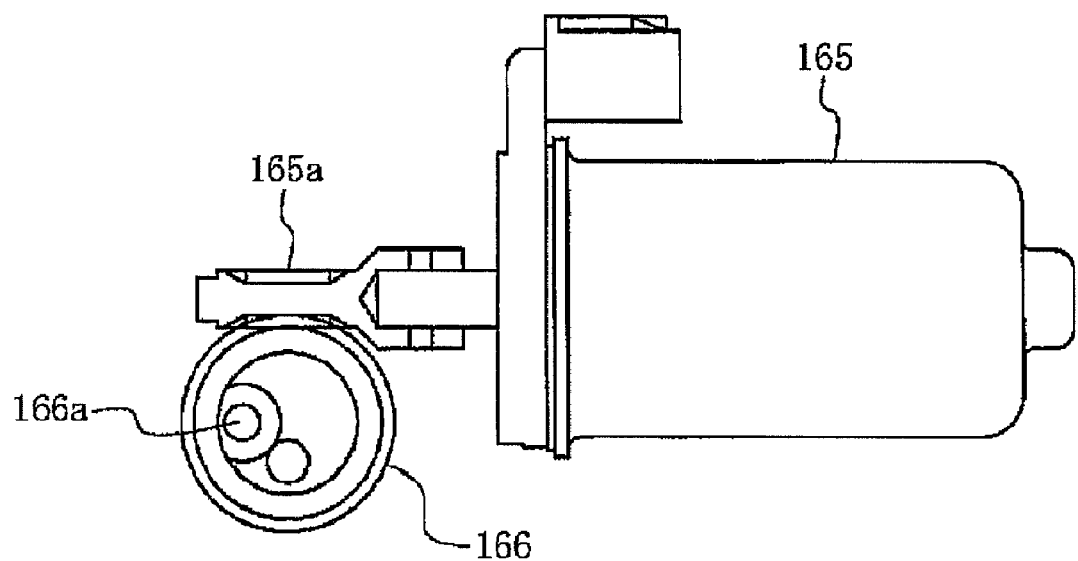
FIG. 11 is a side view of the shift actuator in accordance with an embodiment of the present invention.
Figure 12:
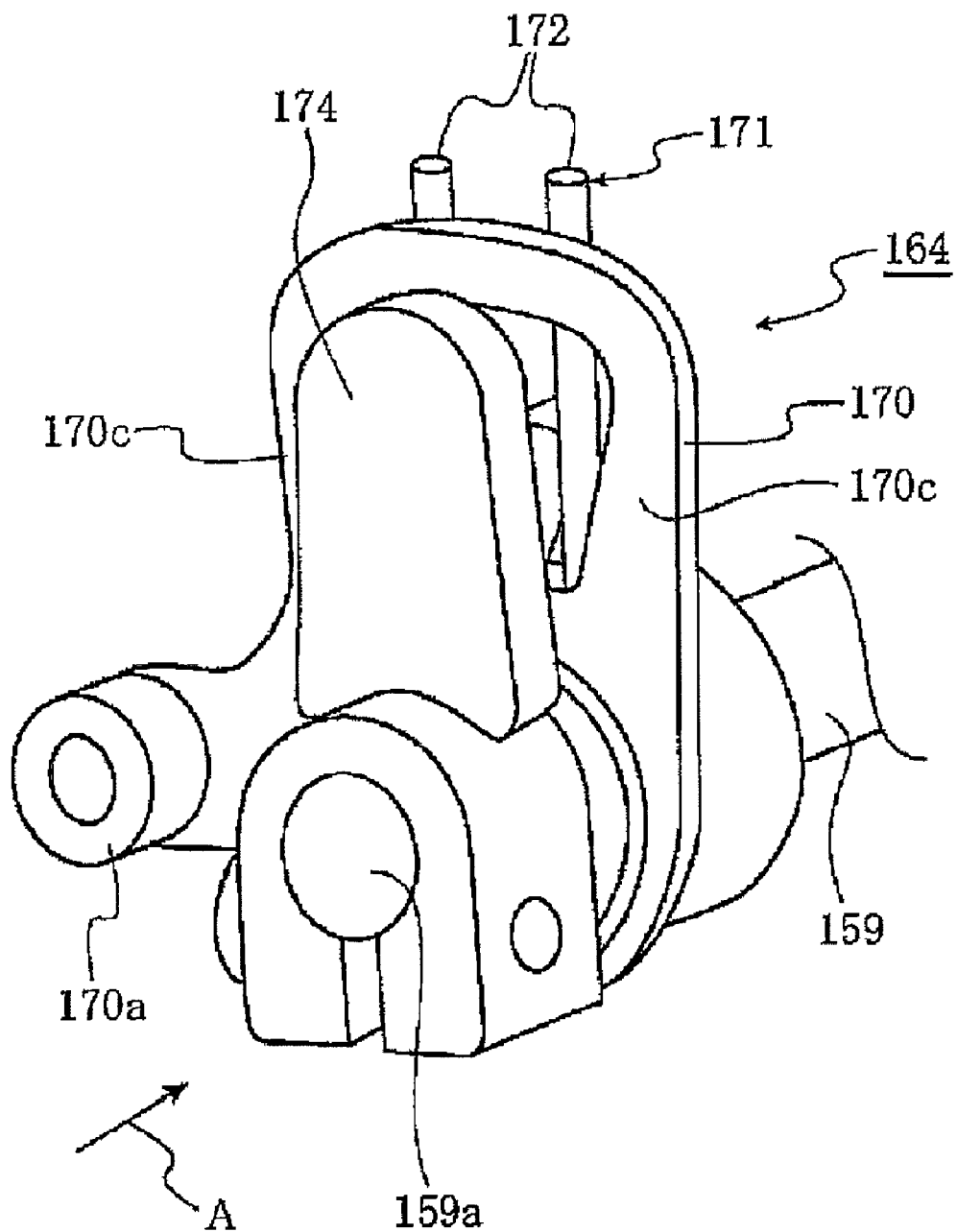
FIG. 12 is a perspective view of an actuation force transmission mechanism in accordance with an embodiment of the present invention.
Figure 13:
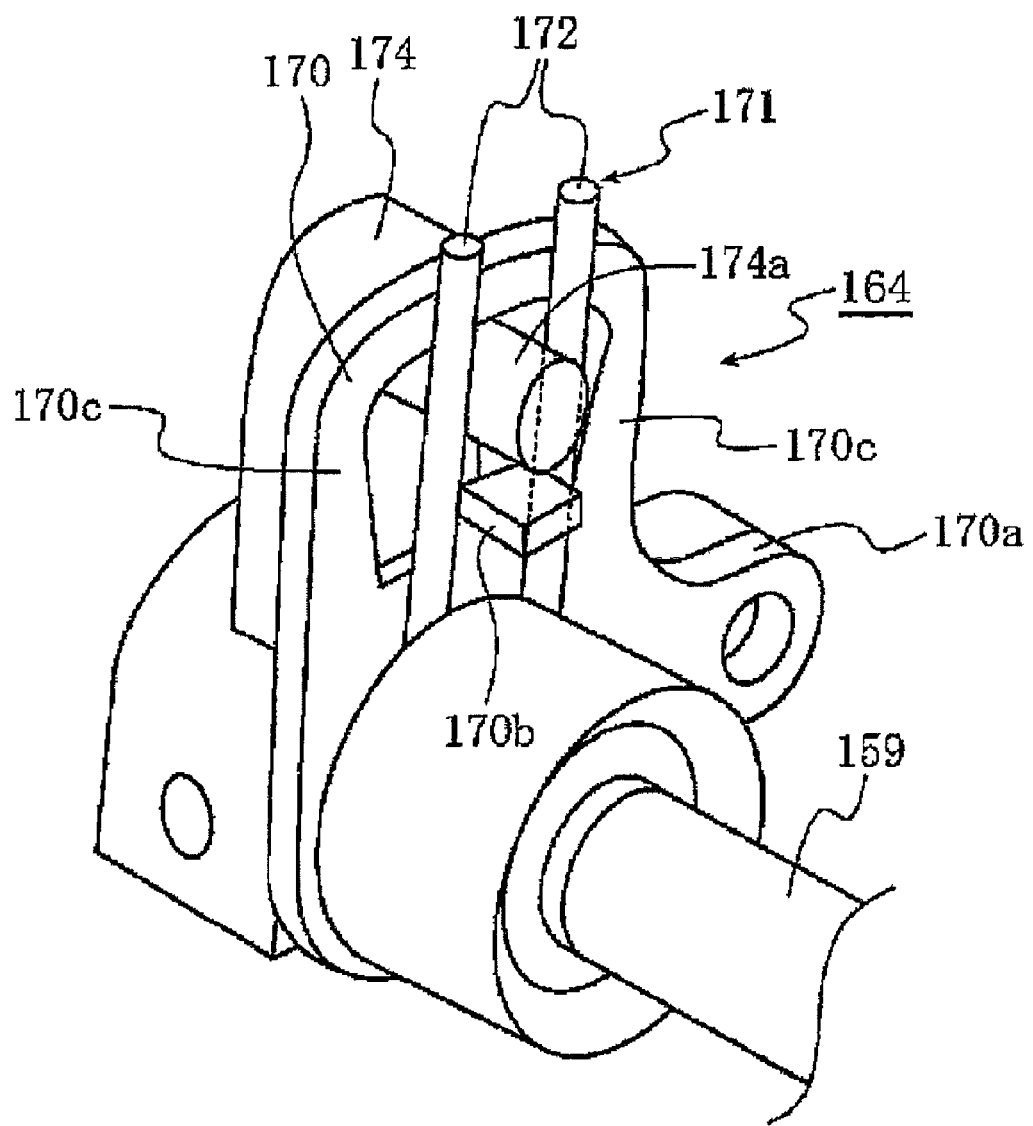
FIG. 13 is another perspective view of the actuation force transmission mechanism in accordance with an embodiment of the present invention, viewed from a direction different from that illustrated in FIG. 12.
Figure 14:
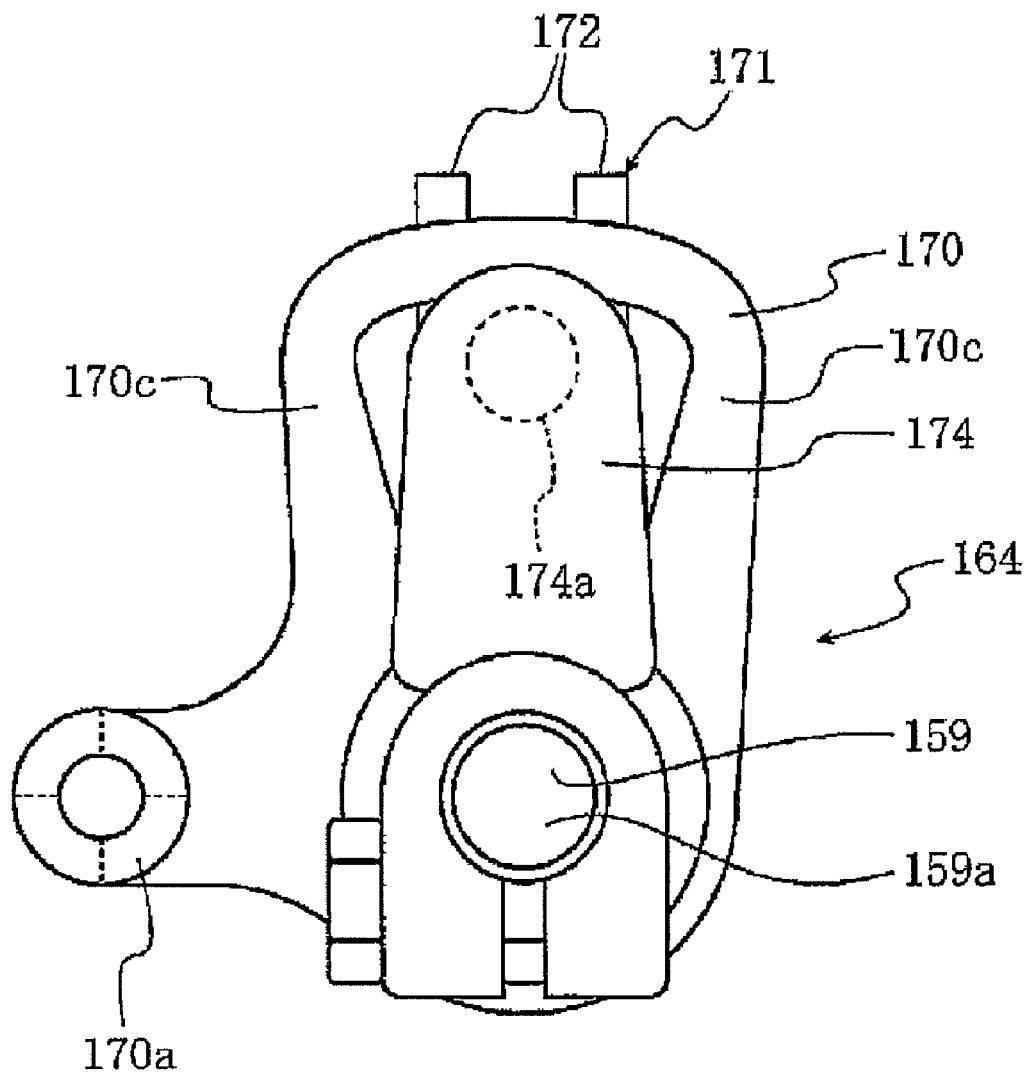
FIG. 14 is a front view of the actuation force transmission mechanism in accordance with an embodiment of the present invention, viewed from the direction of the arrow A in FIG. 12.
Figure 15:
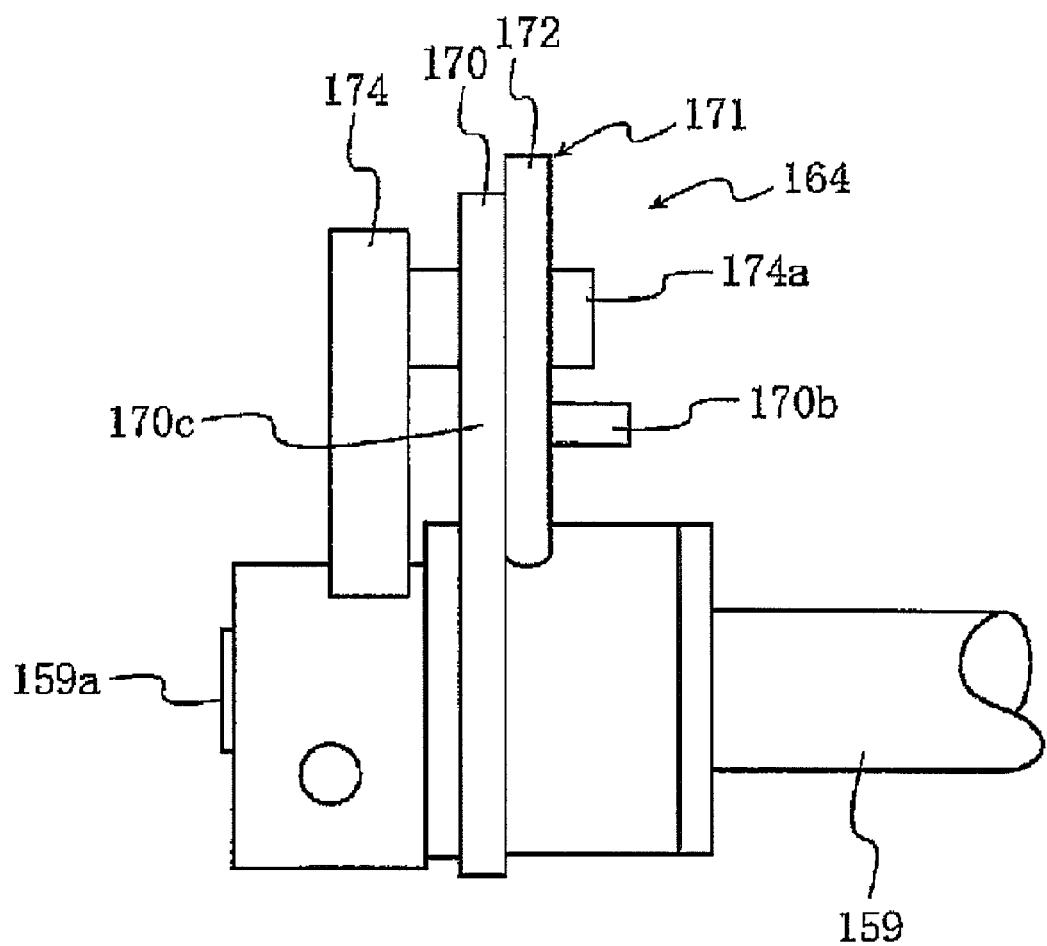
FIG. 15 is a right side view corresponding to FIG. 14.
Figure 16:
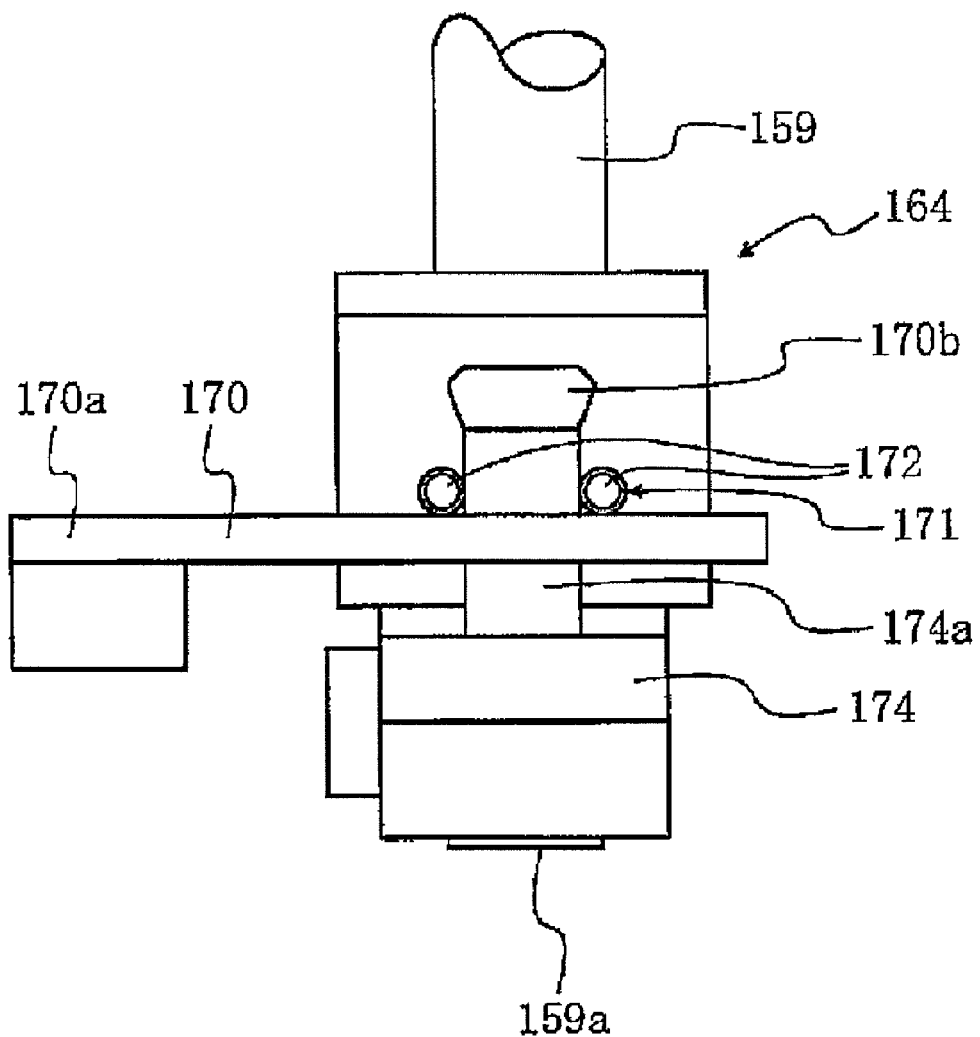
FIG. 16 is a plan view corresponding to FIG. 14.

As shown in FIGS. 7 and 8, the shift actuator 165 can be disposed on a side of the upper part of the engine case 152 along the longitudinal direction of the vehicle. As shown in FIG. 11, the shift actuator 165 can be provided with a worm gear 165a at the distal end of its rotary shaft. The worm gear 165a can be configured to mesh with a pinion gear 166. A coupling shaft 166a can be provided eccentrically with respect to the center axis of the pinion gear 166.

As seen in FIG. 7, one end 167a of a coupling rod 167 extending vertically can be coupled to the coupling shaft 166a for free rotation. Additionally, another end 167b of the coupling rod 167 can be coupled to the actuation force transmission (conveyance) mechanism 164 as shown in FIG. 8.

According to another embodiment, the coupling rod 167 can be constituted with two halves. One of the halves can have a male-threaded end and the other halve can have a female-threaded end. In this regard, and the two halves can be configured to be coupled to each other by screwing and then fixing them with a nut. This structure can allow for the adjustment of the distance between the shift actuator 165 and the shift shaft 159 by loosening the nut, rotating one half of the coupling rod 167 to adjust its length, and then tightening the nut to complete the adjustment.

As shown in an embodiments of FIGS. 12 to 16, in the actuation force transmission mechanism 164, the other end 167b of the coupling rod 167 can be coupled to a rotary frame 170. In this regard, the rotary frame 170 of the actuation force transmission mechanism 164 can be disposed around the shift shaft 159 for free rotation relative to the shift shaft 159. Additionally, the other end 167b of the coupling rod 167 can be coupled to a coupling recess 170a of the rotary frame 170 for free rotation. The rotary frame 170 can be provided with an actuation piece 170b that can be configured to project therefrom, such as by being bent from the rotary frame 170 or otherwise connected thereto. The actuation piece 170b can be inserted between two support bars 172 of a spring 171, which functions as a biasing mechanism. Each bar preferably has a thin elongated rod-like shape, similar to a pine needle. The two support bars 172 can urge the actuation piece 170b toward the neutral position shown in FIGS. 13 and 15.

Also, in accordance with another implementation of the actuation force transmission mechanism 164 shown in FIGS. 12-16, a fixed lever 174 can be fixed to the distal end 159a of the shift shaft 159. As shown in FIGS. 13-16, the fixed lever 174 can be provided with a pin-to-be-pressed 174a projecting therefrom. The pin-to-be-pressed 174a can be inserted between the pair of support bars 172.

With this structure, when the rotary frame 170 is moved rotationally in an arbitrary direction from the neutral position, the actuation piece 170b can press one of the two support bars 172 while the other of the support bars 172 can press the pin-to-be-pressed 174a. In such a manner, the shift shaft 159 can be moved rotationally in an arbitrary direction by a predetermined amount at least due in part to the fixed lever 174. In addition, the shift shaft 159 can also be moved rotationally by the urging force of the support bars 172.

Furthermore, the rotary frame 170 can rotate against the urging force of the spring bars 171, 172 and move relative to the fixed lever 174. Such movement of the rotary frame 170 relative to the fixed lever 174 can be by a predetermined amount in a rotational direction, and then the pin-to-be-pressed 174a of the fixed lever 174 can be contacted and pressed by one of a pair of stopper edges 170c, 170c of the rotary frame 170. This contact can function as a "stopper means". Thus, the movement of the rotary frame 170 relative to the fixed lever 174 in a rotational direction can be stopped. In this regard, the rotational force of the rotary frame 170 can act directly on the fixed lever 174 so that the shift shaft 159 moves rotationally together with the fixed lever 174.

Figure 17:
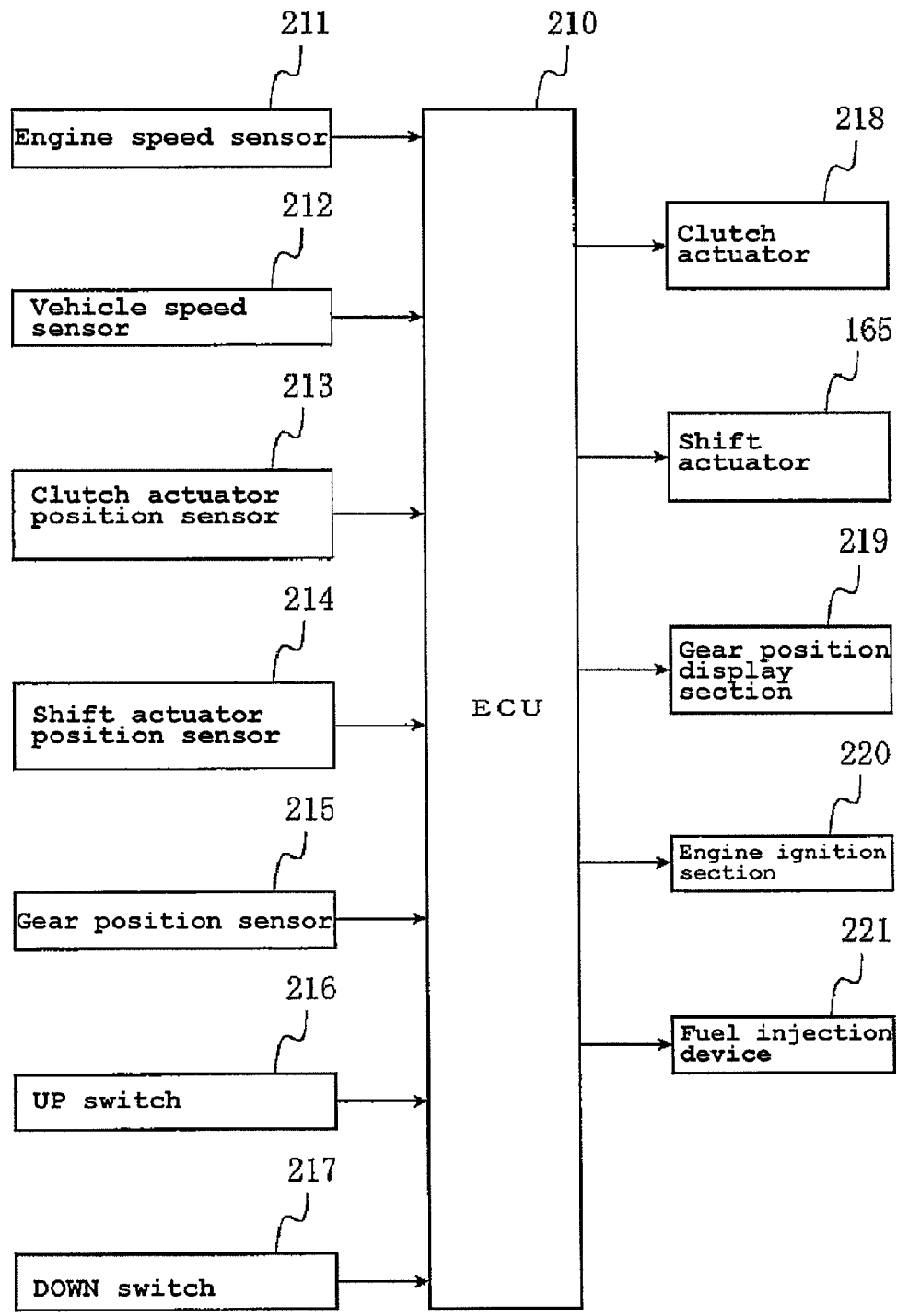
FIG. 17 is a block diagram showing an engine control unit in accordance with an embodiment of the present invention.

Meanwhile, an engine control unit 210 for controlling the engine 151 can be provided as shown in FIG. 17. In accordance with an implementation of the embodiment, various components can be connected to the engine control unit 210; such components can include an engine speed sensor 211, a vehicle speed sensor 212, a clutch actuator position sensor (potentiometric sensor) 213, a shift actuator position sensor 214, a gear position sensor 215, an UP switch 216 for shifting up, and a DOWN switch 217 for shifting down. Detected values and operation signals from these components can be input to the engine control unit 210. In a preferred embodiment, the UP switch 216 and the DOWN switch 217 can be provided on the handlebars 143.

As also shown in FIG. 17, the engine control unit 210 can be connected to a clutch actuator 218, the shift actuator 165, a gear position display section 219, an engine ignition section 220, and a fuel injection device 221, which can be driven and controlled based on the signals from the various sensors 211, etc.

The signals from the UP switch 216, the DOWN switch 217, the shift actuator position sensor 214, the gear position sensor 215, etc., can be input to the engine control unit 210, and control signals from the engine control unit 210 can be used to drive and control the shift actuator 165.

Next, various functions of embodiments of the present invention will be described.

In order to change speeds of the transmission, the UP switch 216 or the DOWN switch 217 can be provided on the handlebars 143. These switches 216, 217 can be operated to actuate the shift actuator 165 in order to rotate the worm gear 165a in a predetermined direction by a predetermined amount.

The pinion gear 166, shown illustratively in FIG. 11, can then rotate in a predetermined direction. In addition, the coupling shaft 166a, which can be disposed eccentrically with respect to the pinion gear 166, can move rotationally so that the coupling rod 167 is pushed downward or pulled upward.

In addition, the rotary frame 170 can move rotationally in a predetermined direction via the coupling rod 167. This rotational movement can cause the actuation piece 170b of the rotary frame 170 to press one of the two support bars 172.

In turn, this can cause the other of the support bars 172 to elastically press the pin-to-be-pressed 174a of the fixed lever 174. The pressing of the support bars 172 against the pin-to-be-pressed 174a can then cause the rotational movement of the shift shaft 159 in a predetermined direction via the fixed lever 174.

When the shift shaft 159 is moved rotationally in this way, the shift cam 158 can move rotationally in a predetermined direction via the ratchet mechanism 160. Further, the shift forks 156 can then be guided by the cam grooves 158a to slide in predetermined directions. The slide gears of the transmission can thus be moved, and the dog can be disengaged while the dog for another is engaged.

When the dog is to be engaged, there are cases where the dog contacts another dog due to bad timing and hence is not engaged immediately. Even in such cases, the dogs can be subjected to comparatively small urging force of the two support bars 172 and hence may not abut against each other with large force. Thus, the components can be protected from damage or the like. After that, the slide gears can move rotationally slightly, and the urging force of the rotational movement can cause the dogs to be meshed with each other reliably.

According to an embodiment of the present invention, at the time when the two support bars 172 are elastically deformed and the rotary frame 170 and the fixed lever 174 are moved relatively in a rotational direction by a predetermined amount, one of the stopper edges 170c of the rotary frame 170 can contact the pin-to-be-pressed 174a of the fixed lever 174. This can cause the rotary frame 170 and the fixed lever 174 to move rotationally together. Thus, even when the dog is engaged and difficult to be disengaged due to residual torque, the dog can be compulsorily disengaged.

To put it in other words, with a simple modification of the structure, the dog can be disengaged and engaged reliably and easily without precise control, even in the case where the shift operation is performed not manually, but mechanically using the shift actuator 165.

According to another embodiment, the actuation force transmission mechanism 164 can be disposed on the axis of the shift shaft 159, as shown in FIG. 8, thereby achieving a compact structure. The actuation force transmission mechanism 164 can also be disposed outside the engine 151, and can nevertheless be protected from water and dust easily by providing a case 192 for covering it.

In accordance with another embodiment, the actuation force transmission mechanism 164 can be disposed on the axis of a gear shaft 190 of a damping mechanism 191, and be coupled to the shift actuator 165 as shown in FIG. 8. Such an embodiment can be an alternative to coupling the actuation force transmission mechanism 164 on the axis of the shift shaft 159.

Next, FIGS. 18 to 21 show another specific structure of the shift control device in accordance with another embodiment of the present invention. The structure to be described here can be different from the above-described structure in respect to an actuation force transmission mechanism 177.

That is, while the above-described actuation force transmission mechanism 164 drives rotationally, the actuation force transmission mechanism 177 to be described here can drive linearly. The actuation force transmission mechanism 177 can be provided in place of the coupling rod 167 in the above-described structure. Further, it is contemplated that the actuation force transmission mechanism 164 may or may not be provided in the such an embodiment.

As shown in the embodiments illustrated in FIGS. 18 to 21, the actuation force transmission mechanism 177 can also be provided with first and second coupling parts 179, 180 slidably movable relative to each other in linear directions. In such an embodiment, a coil spring 181, which is used as an "urging means," and a stopper member 182 can be disposed between the first and second coupling parts 179, 180.

Figure 21:
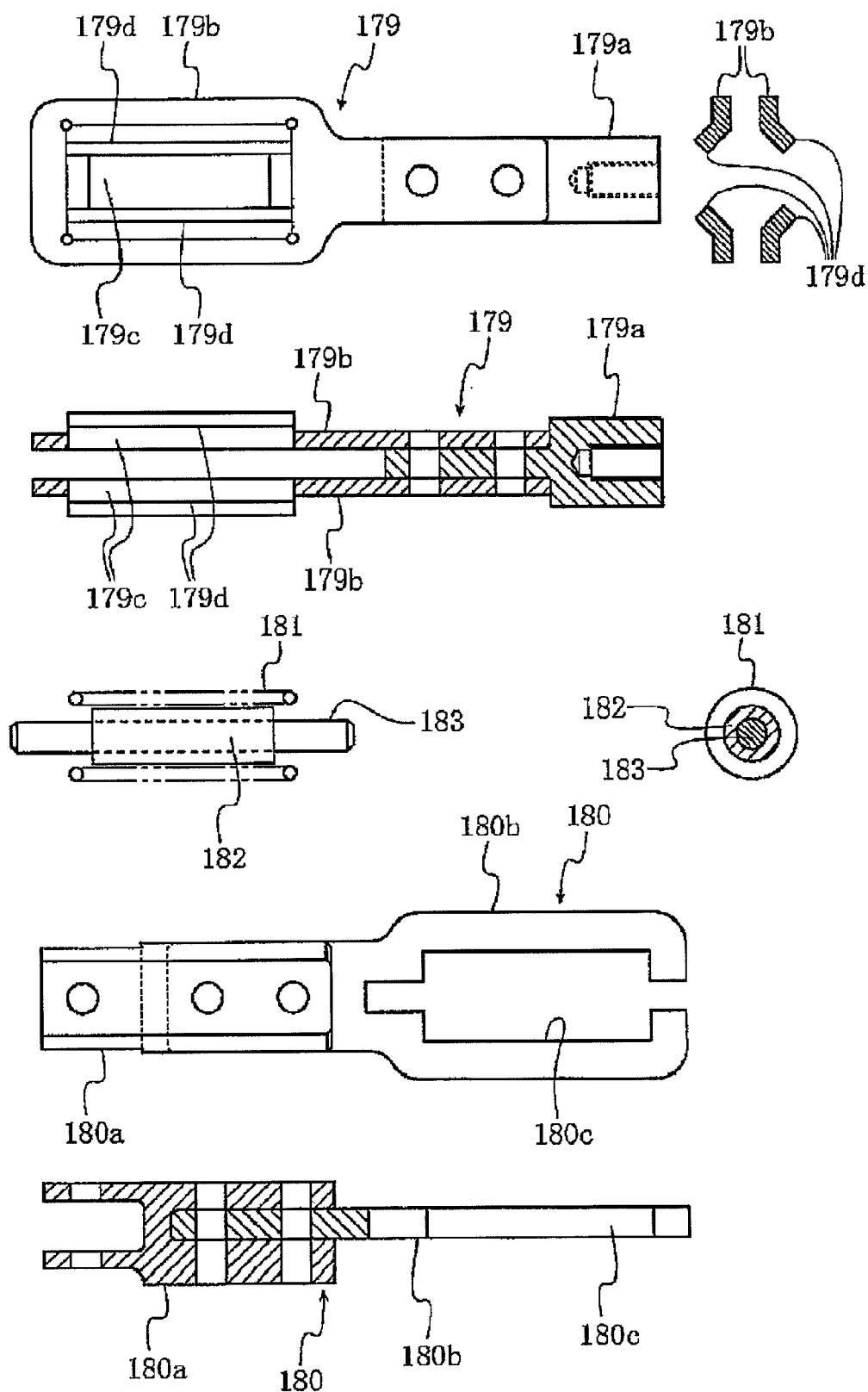
FIG. 21 shows the actuation force transmission mechanism according to another embodiment of the present invention in a divided state.

As shown in the embodiment of FIG. 21, the first coupling part 179 can include a base part 179*a*, and a pair of plate parts 179*b*, which can be fixed to the base part 179*a* with a constant interval. In accordance with an implementation of such an embodiment, the two plate parts 179*b* can be formed with an opening 179*c* where the coil spring 181 and the stopper member 182 are disposed. Further, and the two plate parts 179*b* can also include a coming-off prevention piece 179*d* for preventing the coil spring 181 and the stopper member 182 from coming off.

Also as shown in FIG. 21, the second coupling part 180 can include a base part 180*a*, and a single plate part 180*b* fixed to the base part 180*a*. The single plate part 180*b* can be inserted between the pair of plate parts 179*b* of the first coupling part 179. The plate part 180*b* can also be formed with an opening 180*c* generally of the same size as the opening 179*c* of the plate parts 179*b* of the first coupling part 179.

The coil spring 181 can be accommodated in the openings 179*c*, 180*c* of the respective plate parts 179*b*, 180*b*. Further, the columnar stopper member 182 can be disposed inside the coil spring 181. A support shaft 183 can be slidably inserted through the stopper member 182, and disposed between the plate parts 179*b*.

With this structure, to shift down, for example, the shift actuator 165 can be driven to move the first and second coupling parts 179, 180 of the actuation force transmission mechanism 177 in compressing directions. The coil spring 181 can be compressed against its urging force from the state shown in FIG. 18 to the state shown in FIG. 19. This urging force can rotate the shift shaft 159 to allow engagement or disengagement of the dog.

When the dog is to be engaged, there are cases where the dog contacts another dog due to bad timing and hence is not engaged immediately. Even in such cases, the dogs can be subjected to comparatively small urging force of the coil spring 181 and hence may not abut against each other with large force. Thus, the components can be protected from damage or the like. After that, the slide gears can move rotationally slightly, and the urging force of the rotational movement can cause the dogs to be meshed with each other reliably.

As the coil spring 181 is elastically deformed and compressed, the opening 179*c* of the plate parts 179*b* and the opening 180*c* of the plate part 180*b* can be displaced from each other. At the time when the first and second coupling parts 179, 180 have moved relatively by a predetermined amount in linear directions, the width of an opening common to the displaced openings 179*c*, 180*c* can become coincident with the width of the stopper member 182. This can stop the relative movement of the first and second coupling parts 179, 180, and cause the first and second coupling parts 179, 180 to move rotationally together. Thus, even when the dog is engaged and difficult to be disengaged due to residual torque, the dog can be compulsorily disengaged.

On the other hand, to shift up, for example, the shift actuator 165 can be driven to relatively move the first and second coupling parts 179, 180 in separating directions. Then, the opening 179*c* of the plate parts 179*b* and the opening 180*c* of the plate part 180*b* can be displaced from the generally coincident position, and the coil spring 181 can be compressed. The urging force of the coil spring 181 can tend to ensure engagement of the dog as described above.

Further from this state, as the coil spring 181 is elastically deformed, the opening 179*c* of the plate parts 179*b* and the opening 180*c* of the plate part 180*b* can be displaced from each other. At the time when the first and second coupling parts 179, 180 have moved relatively by a predetermined amount in separating directions, the width of an opening common to the displaced openings 179*c*, 180*c* can become coincident with the width of the stopper member 182. This can stop the relative movement of the first and second coupling parts 179, 180, and cause the first and second coupling parts 179, 180 to move rotationally together. Thus, even when the dog is engaged and difficult to be disengaged due to residual torque, the dog can be compulsorily disengaged.

It is contemplated that the first coupling part 179, the second coupling part 180, and the stopper member 182 can be formed in various configurations. Some exemplary embodiments are shown in FIGS. 22, 23A and 23B.

Figure 22:
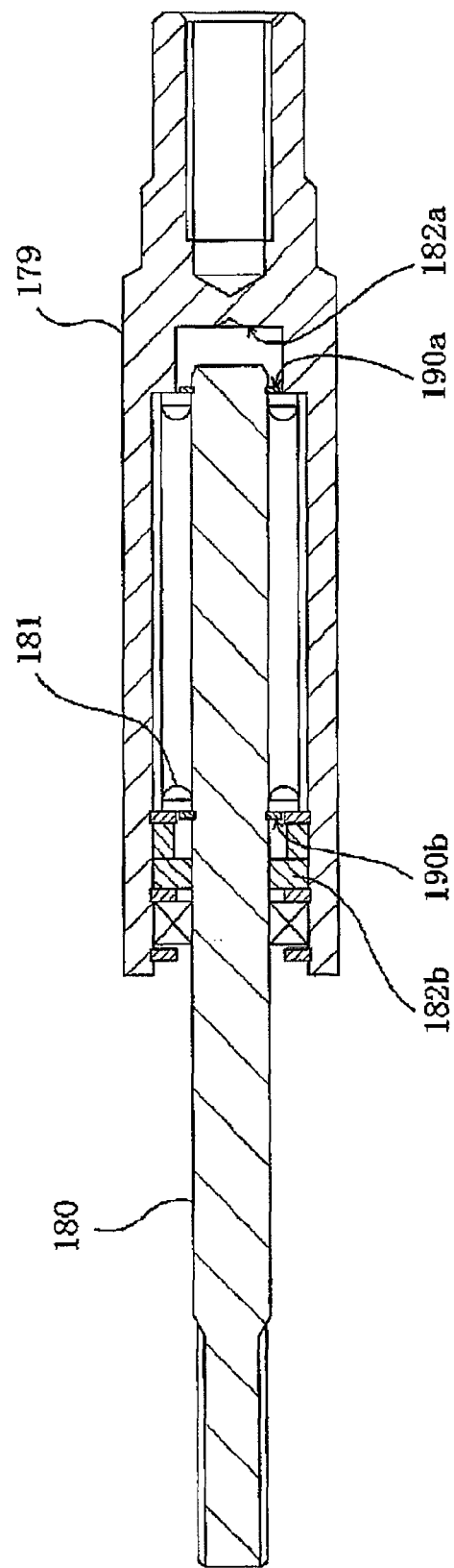
FIG. 22 shows the structure of a stopper member in another embodiment of the present invention.
Figure 23A:
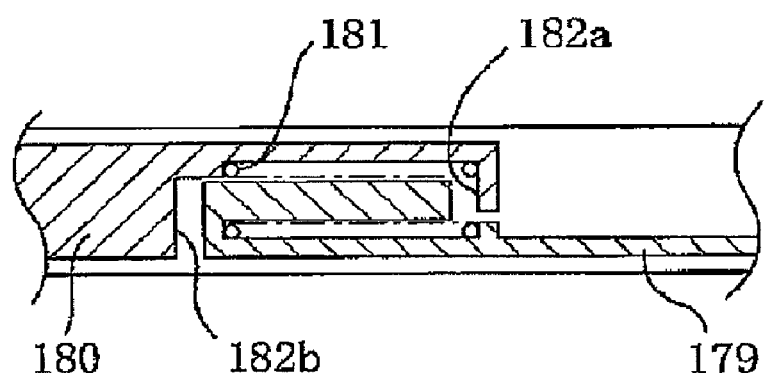
FIGS. 23A and 23B show the structure of the stopper member in still another embodiment of the present invention.
Figure 23B:
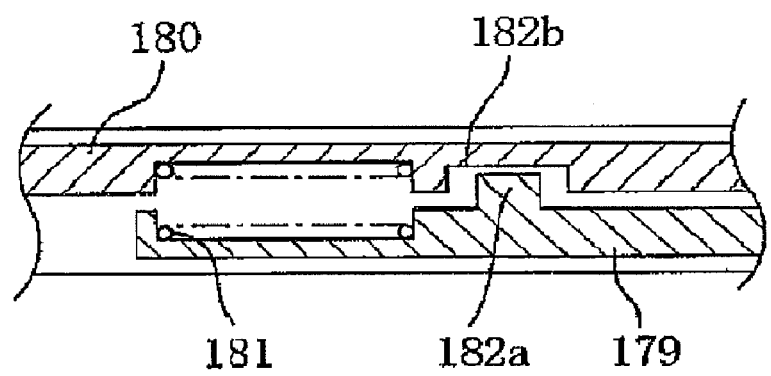

In the example shown in FIG. 22, the second coupling part 180 can be constituted of a rod, and the first coupling part 179 can be constituted of a cylindrical member for accommodating a part of the rod. The coil spring 181, utilizable as an urging means, can be disposed between the first coupling part 179 (shown as a cylindrical member) and the second coupling part 180 (shown as a rod). A sidewall 182*a* inside the first coupling part 179 and a step 182*b* can be provided on the inner surface of the first coupling part 179 to respectively serve as stopper members when the second coupling part 180 moves relative to the first coupling part 179.

For example, when the second coupling part 180 moves relative to the first coupling part 179 toward the right side of FIG. 22, the coil spring 181 can be compressed by a circlip 190*b* embedded in a portion of the first coupling part 179. The second coupling part 180 can move relatively until its distal end contacts the sidewall 182*a* (utilizable as a stopper member) inside the first coupling part 179.

Also, when the second coupling part 180 moves relative to the first coupling part 179 toward the left side of FIG. 22, the coil spring 181 can be compressed by a circlip 190*a* embedded in a portion of the first coupling part 179. The second coupling part 180 can move relatively until the circlip 190*b* embedded in a portion of the first coupling part 179 contacts the step (stopper member) 182*b* provided on the inner surface of the first coupling part 179.

The rod and the cylindrical member constituting the first coupling part 179 and the second coupling part 180 can be of a circular, rectangular or any other shape as long as the cylindrical member can accommodate the rod. The rod can have portions of different diameters, and a portion of a large diameter may be used as a part contacted by the spring.

In addition, the cylindrical member can be constituted with plural members having inner and outer surfaces. For example, the cylindrical member can be constituted with plural semicylindrical members divided along the linear direction of the rod.

As illustrated in the example shown in FIG. 23A, the distal end of the first coupling part 179 can be bent back and inserted into an opening of the second coupling part 180. Sidewalls 182*a*, 182*b* of the opening can be used as stopper members. In the example shown in FIG. 23B, a coil spring 181 is provided in an opening defined by the first coupling part 179 and the second coupling part 180. A projection 182*a* formed on the first coupling part 179 and a recess 182*b* formed in the second coupling part 180 can be fitted to each other to serve as stopper members.

The shift control device in embodiments of the present invention can be mounted on a two-wheeled motor vehicle, as shown in FIG. 6, in order to allow smooth shift change when the two-wheeled motor vehicle is running.

The term "two-wheeled motor vehicle" used herein can include motorcycles such as motorized bicycles (motorbikes) and scooters, and refers specifically to vehicles whose turning can include tilting of the vehicle body. Thus, a vehicle having two or more front wheels and/or two or more rear wheels and hence having a total of at least three wheels, can also be included in the "two-wheeled motor vehicle". The embodiments of the present invention are not limited to use in two-wheeled motor vehicles, but may also be applied to other vehicles which can take advantage of the effect of embodiments of the present invention. Examples of such vehicles include the so-called straddle-type vehicles other than two-wheeled motor vehicles, such as four-wheeled buggies (all terrain vehicles (ATVs)) and snowmobiles.

Further, the "shift actuator" can be of an electric or hydraulic type. Instead of needle-like spring or coil spring, the biasing mechanism can include another type of spring, or an elastic member, such as rubber and resin.

When embodiments of the present invention are to be applied to actual straddle-type vehicles, specific implementations should be examined from a comprehensive viewpoint which allows for each and every requirement in order to produce an excellent effect such as described above.

Further, such implementations preferably facilitate easy installation and maintenance of embodiments of the shift control device which can be used for a straddle-type vehicle, utilizing an existing structure.

Although the embodiments of the present invention have been disclosed in the context of certain preferred embodiments and examples, it will be understood by those skilled in the art that the teachings herein extend beyond the specifically disclosed embodiments to other alternative embodiments and/or uses of the embodiments of the present invention and obvious modifications and equivalents thereof. In addition, while several variations of the embodiments have been shown and described in detail, other modifications, which are within the scope of these embodiments, will be readily apparent to those of skill in the art based upon this disclosure. It is also contemplated that various combination or sub-combinations of the specific features and aspects of the embodiments may be made and still fall within the scope of the teachings. It should be understood that various features and aspects of the disclosed embodiments can be combined with or substituted for one another in order to form varying modes of the disclosed embodiments. Thus, it is intended that the scope of at least some of the embodiments herein disclosed should not be limited by the particular disclosed embodiments described above.

What is claimed is:

1. A vehicle comprising:
an engine case containing at least a portion of an engine;
a speed-changing transmission selectively driven by the engine, the speed changing transmission including a shift shaft and a dog; and
a shift control device arranged to perform shift control of the speed-changing transmission, the shift control device including a shift actuator and an actuation force transmission mechanism, the shift actuator being configured to be stroked by a predetermined amount to move the shift shaft and the dog into and out of engagement,
the actuation force transmission mechanism being disposed outside the engine case and being interposed between the shift actuator and the shift shaft, and the actuation force transmission mechanism including:
first and second coupling parts being sized and configured to be coupled together to provide movement relative to each other;
a biasing mechanism arranged to urge the first and second coupling parts toward a neutral position; and
a stopper mechanism arranged to stop the relative movement of the first and second coupling part when one of the first and second coupling parts is moved relatively from the neutral position against urging force of the biasing mechanism and contacts the stopper mechanism; wherein
the actuation force transmission mechanism is arranged to receive a rotational movement input from the shift actuator and output a rotational movement to the shift shaft.

2. The vehicle according to claim 1, wherein the first and second coupling parts are coupled so as to slide relative to each other.

3. The vehicle according to claim 2, wherein the biasing mechanism includes a compression spring.

4. The vehicle according to claim 1, wherein the first and second coupling parts are coupled for at least rotational movement relative to each other.

5. The vehicle according to claim 4, wherein the biasing mechanism includes a leaf spring having an elongated, rod shape.

6. The vehicle according to claim 4, wherein the actuation force transmission mechanism is disposed on the shift shaft.

7. The vehicle according to claim 6, wherein the actuation force transmission mechanism is disposed on a gear shaft of a speed reduction mechanism coupled to the shift actuator.

8. The vehicle according to claim 1, wherein the shift actuator is coupled to the shift shaft via a coupling mechanism arranged to transmit an actuation force of the shift actuator to the shift shaft, the actuation force transmission mechanism is held by the coupling mechanism.

9. The vehicle according to claim 8, wherein the transmission mechanism is provided in a case held by the coupling mechanism.

10. The vehicle according to claim 1, wherein the shift actuator is coupled to the shift shaft via a coupling mechanism arranged to transmit an actuation force of the shift actuator; the coupling mechanism being of adjustable length.

11. The vehicle according to claim 1, wherein one of the first and second coupling parts is operatively connected to the shift shaft and the other of the first and second coupling parts is operatively connected to the shift actuator.

12. A vehicle comprising:
an engine case containing at least a portion of an engine;
a speed-changing transmission selectively driven by the engine, the speed changing transmission including a shift shaft and a dog; and
a shift control device arranged to perform shift control of the speed-changing transmission, the shift control device including a shift actuator and an actuation force transmission mechanism, the shift actuator being configured to be stroked by a predetermined amount to move the shift shaft and the dog into and out of engagement;
the actuation force transmission mechanism being disposed outside the engine case and being interposed between the shift actuator and the shift shaft, and the actuation force transmission mechanism including:
first and second coupling parts being sized and configured to be coupled together to provide movement relative to each other;

a biasing mechanism arranged to urge the first and second coupling parts toward a neutral position; and a stopper mechanism arranged to stop the relative movement of the first and second coupling part when one of the first and second coupling parts is moved relatively from the neutral position against urging force of the biasing mechanism and contacts the stopper mechanism; wherein the transmission mechanism is arranged such that, when a resistive force acts against the movement of the transmission mechanism, the first coupling part moves relative to the second coupling part against the urging force of the biasing mechanism until the first coupling part is stopped by the stopper mechanism, and wherein in response to a continuing resistive force, the first and second coupling parts move together upon the first coupling part being stopped by the stopper mechanism.

13. The vehicle according to claim 12, wherein the first and second coupling parts are coupled so as to slide relative to each other.

14. The vehicle according to claim 13, wherein the biasing mechanism includes a compression spring.

15. The vehicle according to claim 12, wherein the first and second coupling parts are coupled for at least rotational movement relative to each other.

16. The vehicle according to claim 15, wherein the biasing mechanism includes a leaf spring having an elongated, rod shape.

17. The vehicle according to claim 15, wherein the actuation force transmission mechanism is disposed on the shift shaft.

18. The vehicle according to claim 17, wherein the actuation force transmission mechanism is disposed on a gear shaft of a speed reduction mechanism coupled to the shift actuator.

19. The vehicle according to claim 12, wherein the shift actuator is coupled to the shift shaft via a coupling mechanism arranged to transmit an actuation force of the shift actuator to the shift shaft, the actuation force transmission mechanism is held by the coupling mechanism.

20. The vehicle according to claim 19, wherein the transmission mechanism is provided in a case held by the coupling mechanism.

21. The vehicle according to claim 12, wherein the shift actuator is coupled to the shift shaft via a coupling mechanism arranged to transmit an actuation force of the shift actuator; the coupling mechanism being of adjustable length.

22. The vehicle according to claim 12, wherein one of the first and second coupling parts is operatively connected to the shift shaft and the other of the first and second coupling parts is operatively connected to the shift actuator.

* * * * *